(12) United States Patent
Wadahara et al.

(10) Patent No.: US 8,906,494 B2
(45) Date of Patent: Dec. 9, 2014

(54) PROCESS FOR PRODUCING COMPOSITE PREPREG BASE, LAYERED BASE, AND FIBER-REINFORCED PLASTIC

(71) Applicant: Toray Industries, Inc., Tokyo (JP)

(72) Inventors: Eisuke Wadahara, Ehime (JP); Masahiro Yamanouchi, Ehime (JP); Ichiro Taketa, Ehime (JP); Akihiko Kitano, Ehime (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/716,391

(22) Filed: Dec. 17, 2012

(65) Prior Publication Data

US 2013/0122241 A1 May 16, 2013

Related U.S. Application Data

(62) Division of application No. 12/443,013, filed as application No. PCT/JP2007/068401 on Sep. 21, 2007, now Pat. No. 8,361,265.

(30) Foreign Application Priority Data

Sep. 28, 2006 (JP) ................. 2006-264785

(51) Int. Cl.
| B32B 7/02 | (2006.01) |
| B32B 5/16 | (2006.01) |
| B32B 27/38 | (2006.01) |
| B32B 5/02 | (2006.01) |
| B32B 27/04 | (2006.01) |
| D04H 1/74 | (2006.01) |
| B32B 5/12 | (2006.01) |
| B29B 11/16 | (2006.01) |
| B29C 43/00 | (2006.01) |
| B29C 70/02 | (2006.01) |
| B29C 70/08 | (2006.01) |
| B29C 70/20 | (2006.01) |
| B29C 70/54 | (2006.01) |
| C08J 5/24 | (2006.01) |
| B29K 105/08 | (2006.01) |

(52) U.S. Cl.
CPC . *B32B 5/12* (2013.01); *B29B 11/16* (2013.01); *B29C 43/003* (2013.01); *B29C 70/025* (2013.01); *B29C 70/086* (2013.01); *B29C 70/20* (2013.01); *B29C 70/545* (2013.01); *C08J 5/24* (2013.01); *B29C 70/202* (2013.01); *B29K 2105/0854* (2013.01); *B29K 2105/0872* (2013.01)
USPC ............. 428/214; 428/327; 442/175; 442/63; 442/76; 442/104; 442/366

(58) Field of Classification Search
None
See application file for complete search history.

(56) References Cited

U.S. PATENT DOCUMENTS

| 4,759,985 A | 7/1988 | Armiger et al. |
| 4,990,207 A | 2/1991 | Sakai et al. |

(Continued)

FOREIGN PATENT DOCUMENTS

| JP | 63-247012 A | 10/1988 |
| JP | 1-320146 A | 12/1989 |
| JP | 2-115236 A | 4/1990 |

*Primary Examiner* — David Sample
*Assistant Examiner* — Nicole T Gugliotta
(74) *Attorney, Agent, or Firm* — DLA Piper LLP (US)

(57) ABSTRACT

A composite prepreg base includes a raw prepreg base comprising a fiber sheet including discontinuous reinforcing fibers arranged in one direction and having a fiber length of 1-300 mm and a matrix resin infiltrated into the fiber sheet; and an additional resin layer formed on at least one surface of the raw prepreg base. The composite prepreg base is produced by a process including (i) the step of preparing the raw prepreg base and (ii) the step of forming an additional resin layer on at least one surface of the raw prepreg base prepared. A layered base includes two or more sheets of the composite prepreg base which have been superposed so that the additional resin layer is present on at least one surface; and a fiber-reinforced plastic formed by heating and pressing the layered base.

5 Claims, 3 Drawing Sheets

(56) References Cited

U.S. PATENT DOCUMENTS

| | | | |
|---|---|---|---|
| 5,604,020 A * | 2/1997 | Fitchmun | 428/213 |
| 8,354,156 B2 * | 1/2013 | Taketa et al. | 428/113 |
| 8,361,265 B2 * | 1/2013 | Wadahara et al. | 156/244.18 |
| 8,758,874 B2 * | 6/2014 | Taketa et al. | 428/113 |
| 2005/0053787 A1 * | 3/2005 | Yamasaki et al. | 428/411.1 |
| 2006/0093824 A1 | 5/2006 | Nozaki | |

* cited by examiner

PROCESS FOR PRODUCING COMPOSITE PREPREG BASE, LAYERED BASE, AND FIBER-REINFORCED PLASTIC

RELATED APPLICATIONS

This is a divisional application of U.S. application Ser. No. 12/443,013 filed Mar. 26, 2009, which is a §371 of International Application No. PCT/JP2007/068401, with an international filing date of Sep. 21, 2007 (WO 2008/038591A1, published Apr. 3, 2008), which is based on Japanese Patent Application No. 2006-264785, filed Sep. 28, 2006, the subject matter of which is incorporated by reference.

TECHNICAL FIELD

This disclosure relates to a process for producing a composite prepreg base, and also relates to a layered base comprising a plurality of the composite prepreg bases laminated each other, and a fiber reinforced plastic formed with the layered base.

BACKGROUND

A fiber reinforced plastic (hereinafter also referred to as FRP) comprising reinforcing fibers and a matrix resin has gained greater attention in industrial fields because of having a high specific strength, a high specific modulus, good mechanical characteristics, and other highly functional characteristics such as weather resistance and chemical resistance, and demands for them is increasing every year.

The most widely used molding method for producing an FRP having highly functional characteristics is an autoclave molding process in which a layered body produced by laminating a plurality of prepreg bases each of which is prepared by impregnating a sheet comprising continuous reinforcing fibers with a semi-cured matrix resin, is heated and pressed in an autoclave and the matrix resin is cured to mold an FRP.

The FRP produced by the autoclave molding process is composed of the reinforcing fibers being in continuous and therefore has good mechanical properties. Furthermore, where the continuous fibers are arranged regularly such as in one direction, it will be easy to design an FRP having desired mechanical properties by arranging the prepreg base plates in an appropriate configuration or alignment, and the resulting FRP products will be small in variation of mechanical properties.

However, on the other hand, it is difficult to produce an FRP having a complicated shape such as three-dimensional since the reinforcing fibers in the prepreg base are in continuous and, therefore, conventional FRP products have been limited to planar or nearly planar shapes.

A press molding process that uses a SMC (sheet molding compound) is one of the molding methods that serve to mold an FRP having a complicated shape such as a three-dimensional shape. In that molding process, chopped strands, normally cut into pieces of about 25 mm, are impregnated with a matrix resin to provide a SMC sheet comprising partially cured resin, which is then heated and pressed by using a press machine to produce an FRP. In most cases, the SMC is cut into sheets each of which is smaller than a molding FRP before the pressing, the sheets are placed on a mold, and the sheets are extended by pressing, or made to flow, into a desired shape. Thus, the flowing allows the material to be molded into a complicated shape such as a three-dimensional shape.

However, the chopped strands inevitably suffer uneven distribution and orientation during the SMC sheet forming step and, therefore, the resulting FRP product will have poor mechanical properties that vary largely over the product, causing some problems. Moreover, in the case of thin components, in particular, the molded products tend to suffer warp and shallow depressions, etc. in the surface, often leading to decreased suitability as components of structural materials.

To eliminate such disadvantages in the above-mentioned FRP materials and their production processes, an improved FRP production method has been proposed in which deep cuts are put in a prepreg base that is composed of continuous fibers and a thermoplastic resin, in such a way that cuts are put in the continuous fibers in the direction across the continuous fibers, with the aim of increasing the flowability of the fibers during a molding process and decreasing the variation in the mechanical properties in the resulting moldings JP 63-247012 A.

In the prepreg base described in JP 63-247012 A, however, cuts are simply put in the prepreg base though thermoplastic resin having a high melt viscosity is used as matrix and, therefore, if an attempt is made to produce a molded product having undulating portions, it will be impossible not only to achieve such an undulating shape precisely but also maintain a high flowability of the prepreg base itself and that of the fibers in the prepreg base that are no longer continuous after being cut to limited lengths.

It could be helpful to provide a method for producing a prepreg base having a good flowability of the prepreg base itself and/or fibers having a certain length and being not continuous which is prepared with cuts of fibers in the prepreg base, having a good followability to a shape of an intended mold, and having a wide range of selecting molding conditions, at the time of molding a mold.

It could also be helpful to provide a layered base that can be molded into an FRP product having excellent mechanical properties, quality stability, and appearance quality, and also provide FRP products that can be produced from the prepreg base or the layered base.

SUMMARY

We thus provide a method for producing a composite prepreg base comprising a raw prepreg base composed of a fiber sheet of discontinuous reinforcing fibers having a fiber length of 1 to 300 mm and arranged in one direction and a matrix resin impregnated into the fiber sheet, and an additional resin layer formed on at least one of the surfaces of the raw prepreg base, which comprises the steps of:

(1-a) preparing a prepreg base comprising a fiber sheet of continuous reinforcing fibers arranged in one direction and a matrix resin impregnated at least partly into the fiber sheet, (1-b) forming an additional resin layer on at least one of the surfaces of the prepreg base prepared in the step (1-a), and (1-c) forming cuts into the prepreg base having the additional resin layer formed in the step (1-b) to form discontinuous reinforcing fibers having a fiber length of 1 to 300 mm from the continuous reinforcing fibers.

We also provide a method for producing a composite prepreg base comprising a raw prepreg base composed of a fiber sheet of discontinuous reinforcing fibers having a fiber length of 1 to 300 mm and arranged in one direction and a matrix resin impregnated into the fiber sheet, and an additional resin layer formed on at least one of the surfaces of the raw prepreg base, which comprises the steps of:

(2-a) preparing a prepreg base comprising a fiber sheet of continuous reinforcing fibers arranged in one direction and a matrix resin impregnated at least partly into the fiber sheet, (2-b) forming cuts into the prepreg base prepared in the step (2-a) to form discontinuous reinforcing fibers having a fiber length of 1 to 300 mm from the continuous reinforcing fibers, and (2-c) forming an additional resin layer on at least one of the surfaces of the prepreg base having the discontinuous fibers having the fiber length of 1 to 300 mm prepared in the step (2-b).

We further provide a method for producing a composite prepreg base comprising a raw prepreg base composed of a fiber sheet of discontinuous reinforcing fibers having a fiber length of 1 to 300 mm and arranged in one direction and a matrix resin impregnated into the fiber sheet, and an additional resin layer formed on at least one of the surfaces of the raw prepreg base, which comprises the steps of:

(3-a) preparing a fiber sheet of discontinuous reinforcing fibers having a fiber length of 1 to 300 mm and arranged in one direction, wherein the edges of the fibers having the fiber length are located at different positions in the length direction, (3-b) forming a prepreg base by impregnating a matrix resin at least partially into the fiber sheet prepared in the step (3-a), and (3-c) forming an additional resin layer on at least one of the surfaces of the prepreg base formed in the step (3-b).

In the composite prepreg base production processes, it is preferable that the cuts formed in the prepreg base comprises cuts having a length of 2 to 50 mm arranged with an interval each other in cut-rows each of which is directed to a direction across the direction of the arrangement of the reinforcing fibers and which are arranged with an interval each other in the direction of the arrangement of the reinforcing fibers, wherein a distance between two cut-rows that are in such a relation that when one of them is moved in the direction of the arrangement of the reinforcing fibers, each cut on it meets another on the other cut-row, is in the range of 10 to 100 mm; positions of the cuts in the adjacent cut-rows in the direction of the arrangement of the reinforcing fibers are shifted each other in the direction perpendicular to the direction of the arrangement of the reinforcing fibers; and when the cuts are projected in the direction of the arrangement of the reinforcing fibers, position of the ends of cuts in the adjacent cut-rows in the direction of the arrangement of the reinforcing fibers are overlapped each other with an overlap in the range from 0.1 mm to 10% of the length of the shortest of the adjacent cuts in the direction perpendicular to the direction of the arrangement of the reinforcing fibers.

In the composite prepreg base production processes, it is preferable that the additional resin layer formed on at least one of the surfaces of the prepreg base covers the whole or a part of a surface of the prepreg base and a thickness of the additional resin layer formed is in the range from the diameter of a single fiber in the reinforcing fibers constituting the reinforcing fiber sheet to the 0.5 times of a thickness of the raw prepreg base.

It is preferable that the additional resin layer contains particulate or fibrous fillers.

It is preferable that a resin constituting the additional resin layer differs from the matrix resin constituting the raw prepreg base, and the minimum viscosity of the resin constituting the additional resin layer, in the range from room temperature to the decomposition temperature, is lower than that of the matrix resin.

It is also preferable that a resin constituting the additional resin layer differs from the matrix resin constituting the raw prepreg base, and a fracture toughness of the resin constituting the additional resin layer is higher than that of the matrix resin.

It is further preferable that the matrix resin constituting the raw prepreg base is a thermosetting resin, and the resin constituting the additional resin layer is a thermoplastic resin.

We further provide a layered base comprising a plurality of composite prepreg bases each of which is produced by a method for producing a composite prepreg base according to any one of composite prepreg base production processes in which the composite prepreg bases are laminated so that the additional resin layer exists on at least one of the surfaces of the composite prepreg base, and the adjacent composite prepreg bases are adhered at least partially to each other.

We still further provide a layered base comprising a plurality of laminated layers each of which is composed of a raw prepreg base comprising a fiber sheet of discontinuous reinforcing fibers having a fiber length of 1 to 300 mm and arranged in one direction and a matrix resin impregnated into the fiber sheet, wherein an additional resin layer is provided on at least one of the outermost layers and in at least one of interlayer spaces of the laminated layers, and at the interlayer spaces of the laminated layers, the raw prepreg bases each other and/or the raw prepreg base and the additional resin layer are adhered at least partially at the interface between them to be integrated each other.

It is preferable that thicknesses of the additional resin layers on at least two composite prepreg bases in the plurality of composite prepreg bases laminated each other are different each other.

It is preferable that a thickness of the additional resin layer on a surface of the layered base is larger than that of the additional resin layer inside the layered base.

It is also preferable that the matrix resin that constitutes the raw prepreg base is a thermosetting resin, and a resin that constitutes the additional resin layer is a thermoplastic resin which exposes on a surface of the layered base.

We yet further provide a fiber reinforced plastic produced by heating and pressing the layered base, wherein an additional resin layer exists on at least one of the surfaces of the layered base.

It is preferable that a resin that constitutes the additional resin layer exists between the ends of adjacent of the discontinuous fibers of the reinforcing fibers.

Our composite prepreg base production process serves to form an additional resin layer on at least one of the surfaces of a raw prepreg base that comprises a fiber sheet of discontinuous reinforcing fibers having a fiber length of 1 to 300 mm oriented in one direction and a matrix resin impregnated into the fiber sheet. In the process to produce a molded product by heating and pressing the composite prepreg base produced above or a layered base produced by laminating the composite prepreg bases, the additional resin layer serves to facilitate an alteration of a position or shape of the composite prepreg base and/or the layered base.

Since the additional resin layer and the raw prepreg base are prepared separately, a resin to be used to form the additional resin layer can be selected relatively unrestrictedly based on considerations of production conditions for an intended molded product and flow state of the fibers during the production process without significant restrictions relating to the matrix resin used in the raw prepreg base. This allows good flowability of the composite prepreg base and/or the layered base during the production of the intended molded product, high moldability into the intended product shape, and a wide range of production conditions for the intended product. Furthermore, this makes it possible to produce a fiber reinforced plastic having good mechanical properties, high quality stability and good appearance quality.

The resulting fiber reinforced plastics can be used effectively as material for structural elements that have a complicated shape containing ribs and quadric surfaces, such as those of transport equipment (automobile, aircraft, naval vessels and the like), industrial machines, precision equipment and sports equipment (bicycle, golf outfit and the like).

REFERENCE SIGNS LIST

Figure 1:
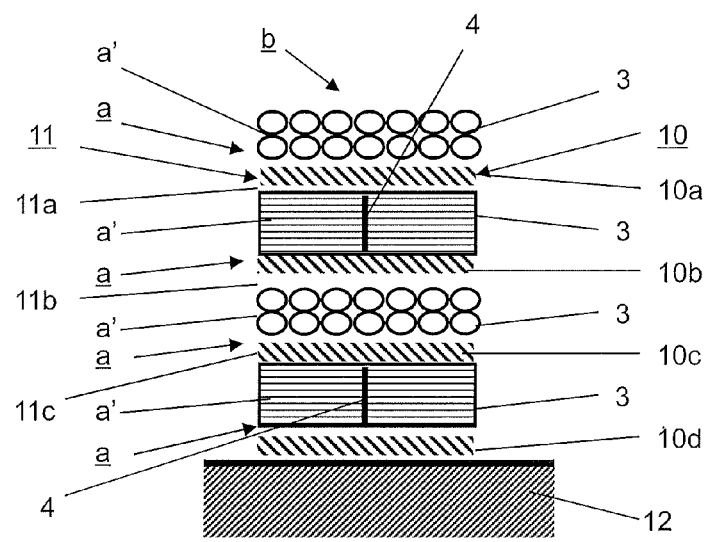
FIG. 1 shows a schematic cross section of a layered base laminated with a plurality of composite prepreg bases (four bases are shown in the figure) produced by a composite prepreg base production process.

1: the direction of the arrangement of reinforcing fibers
2: the direction across the direction of the arrangement of reinforcing fibers
3: reinforcing fibers
4: an end of discontinuous reinforcing fibers
5: a width of overlap between cuts in adjacent cut-rows when the cuts are projected in the direction of the arrangement of the reinforcing fibers
6: a fiber length of discontinuous fibers
7: a cut-row of cuts
7a, 7b: cuts
8: a cut-row of cuts
8a, 8b, 8c: cuts
9: a cut-row of cuts
9a, 9b: cuts
10, 10a, 10b, 10c, 10d: an additional resin layer
11, 11a, 11b, 11c: an interlayer space
12: the lower mold in a mold
13: an interval between the ends of adjacent discontinuous reinforcing fibers
13a: a gap between the ends of adjacent discontinuous reinforcing fibers
14: a void
15: a resin that has flowed into a gap between the ends of adjacent discontinuous reinforcing fibers
30: a fiber sheet
40: a plurality of cuts, or an individual cut
50: a plurality of cut-rows of cuts, or an individual cut-row of cuts
a: a composite prepreg base
a': a raw prepreg base
b: a layered base
c: an FRP
d: a conventional layered base
e: a conventional FRP

DETAILED DESCRIPTION

The term "a raw prepreg base" refers to a prepreg base composed of a fiber sheet of discontinuous reinforcing fibers having a fiber length of 1 to 300 mm arranged in one direction and a matrix resin impregnated into the fiber sheet. A composite prepreg base produced based on our method for producing a composite prepreg base differs from the raw prepreg base in that an additional resin layer is provided on at least one of the surfaces of the raw prepreg base. The term "fiber sheet" refers to a sheet in which a plurality of fibers arranged in a form of sheet-like or tape-like free from impregnation of a resin which is widely used in a conventional prepreg or a production thereof. The plurality of fibers is usually arranged with impregnation of a matrix resin which is coated on a release paper having a form of sheet-like or tape-like.

In the fiber sheet, the whole of the plurality of arranged fibers may be completely impregnated with the matrix resin or a part of the plurality of arranged fibers may be partially impregnated with the matrix resin. A complete impregnation with the matrix resin serves effectively to reduce a fraction of voids in an FRP produced by molding the composite prepreg base, and therefore, the raw prepreg base comprising the fiber sheet impregnated substantially completely with the matrix resin are used preferably for implementing the invention.

"Substantially complete impregnation" as referred to herein is defined normally as a state in which a void fraction is in 2% or less. "Partial impregnation" is defined normally as a state in which a void fraction is more than 2% or a state free of voids but containing dry parts (parts free of adhesive) in the arranged fibers (i.e. a state of a semipreg). Further, the term "fiber" and term including "fiber" (such as "a direction of fiber") refers to a reinforcing fiber, unless otherwise defined.

FIG. 1 shows a schematic cross section of a layered base b obtained by laminating four composite prepreg bases each of which was produced by a method for producing a composite prepreg base. In FIG. 1, the layered base b is produced by laminating four composite prepreg bases a, with the lamination directions (fibers arrangement directions) being shifted with 90° each other. The layered base b is placed on the upper face of a lower mold 12. In FIG. 1, a raw prepreg base a' in each of second and fourth layers has ends 4 of discontinuous reinforcing fibers 3 formed by cuts in the central region. Additional resin layers 10a, 10b, 10c and 10d are located in the interlayer spaces 11a, 11b and 11c, and between the fourth layer counted from the top and the lower mold 12. Hereinafter, each of these interlayer spaces and each of these additional resin layers will be referred to as an interlayer space 11 and an additional resin layer 12, respectively, without consideration of their positions.

Figure 2:
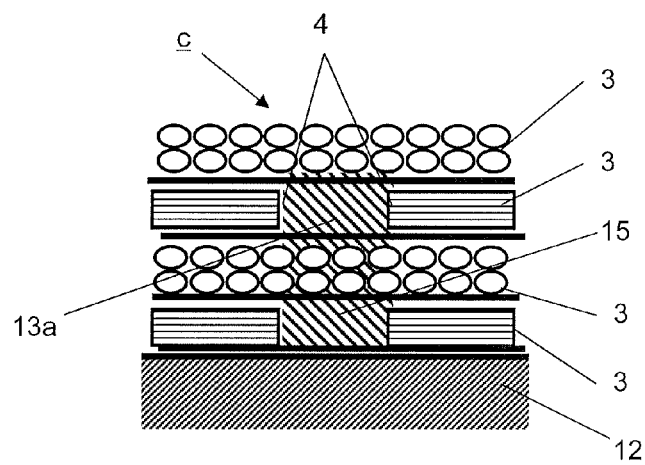
FIG. 2 shows a schematic cross section of an FRP of the invention produced from the layered base illustrated in FIG. 1.

FIG. 2 shows a schematic cross section of an FRP c produced from the layered base b illustrated in FIG. 1. The FRP c is formed by applying a pressing pressure from above onto the layered base b in FIG. 1. In FIG. 2, the second and fourth layers counted from the top are divided in the central region into the right and left hands, and the ends 4 of the discontinuous reinforcing fibers 3, which are in contact with each other in the case of the layered base b in FIG. 1, are separated with an interval 13 to form a gap 13a. In FIG. 2, the additional resin layers 10a, 10b, 10c and 10d, which are located in the interlayer spaces 11a, 11b and 11c, and between the fourth layer and the lower mold 12 in FIG. 1, are extended thinly between the layers and over the surface in the FRP c, and flow into the gap 13a that is formed in the interval 13 between the ends 4 of the adjacent discontinuous reinforcing fibers, filling the gap 13a as resin 15.

Figure 4:
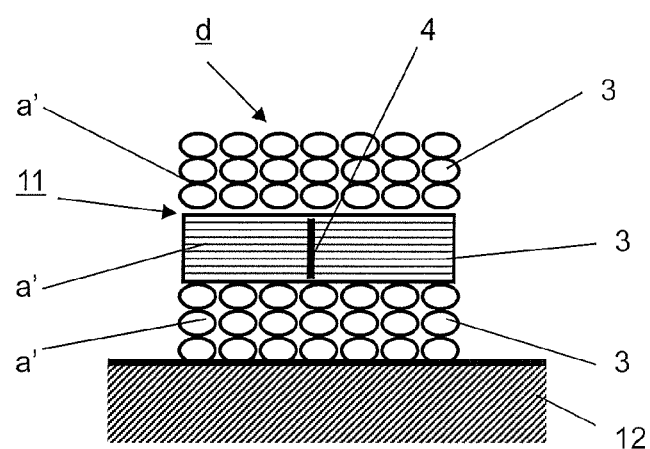
FIG. 4 shows a schematic cross section of a layered base laminated with conventional prepreg bases (four bases are shown in the figure).

FIG. 4 shows a schematic cross section of a layered base d obtained by laminating four conventional prepreg bases a'. Each of the conventional prepreg bases a' is the same to the raw prepreg base a' shown in FIG. 1, and therefore, they are represented by the same sign a'. In FIG. 4, the layered base d is formed by laminating four prepreg bases a', with the lamination directions (fibers arrangement directions) being shifted with 90° each other. In FIG. 4, the prepreg bases a' in the second and fourth layers counted from the top contain ends 4 of discontinuous reinforcing fibers 3 formed by cuts in the central region.

Figure 5:
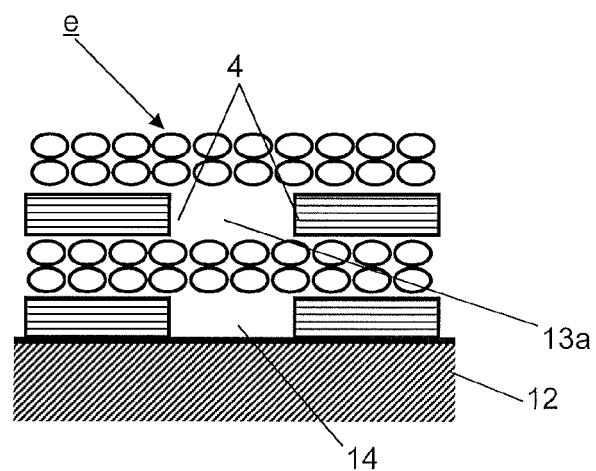
FIG. 5 shows a schematic cross section of a conventional FRP produced from the layered base illustrated in FIG. 4.

FIG. 5 shows a schematic cross section of a conventional FRP e produced from the layered base d illustrated in FIG. 4. The FRP e is produced by applying a pressing pressure from above onto the layered base d in FIG. 4. In FIG. 5, the second and fourth layers counted from the top are divided in the central region into the right and left hands, and the ends 4 of the discontinuous reinforcing fibers, which are in contact with each other in the case of the layered base d in FIG. 4, are separated with an interval 13 to form a gap 13a. A matrix resin squeezed out from each of the layers or adjacent layers enter the gap 13a that is formed in the interval 13 between the ends 4 of adjacent the discontinuous reinforcing fibers. However, the quantity of resin that can enter the gap 13a is small, leading to formation of voids in the gap 13a.

The composite prepreg base a produced by a method for producing our composite prepreg base comprises discontinuous reinforcing fibers 3 arranged in one direction, and a laminar resin layer, i.e. the additional resin layer 10, formed on at least one of the surfaces of the raw prepreg base a'. This configuration serves to achieve the following effects.

First, the reinforcing fibers 3 are arranged in one direction, and this arrangement direction of the reinforcing fibers 3 can be controlled by adjusting the arrangement direction of the composite prepreg base a during the lamination step. The use of a composite prepreg base a comprising reinforcing fibers oriented in one direction, therefore, makes it possible to design an FRP having desired mechanical properties and produce an FRP having high quality stability (first effect).

Second, the reinforcing fibers 3 are discontinuous, and this allows the composite prepreg base a to flow in the orientation direction of the reinforcing fibers 3 during the FRP molding process. In FIG. 1, a layer comprising the raw prepreg base a' is extended in the width direction (right to left direction in the case of the first and third layers counted from the top) of the reinforcing fibers 3. At the same time, as the interval 13 between the ends 4 of adjacent discontinuous fibers is extended, the entire composite prepreg base a is also extend in the fiber direction (right to left direction in the case of the second and fourth layers counted from the top) of the reinforcing fibers 3, leading to good molding properties (high flowability, shape following characteristics and wide range of effective molding conditions) (second effect).

If the reinforcing fibers 3 are entirely continuous fibers, on the other hand, the composite prepreg base a will not be able to flow in the fiber arrangement direction, making it impossible to produce an FRP in a complicated shape.

In the discontinuous reinforcing fibers 3, the fibers in the composite prepreg base a has a finite length, which means that the length of the reinforcing fibers 3 is smaller than the total length of the composite prepreg base a in the fiber arrangement direction of the composite prepreg base a. Specifically, the fiber length in the reinforcing fibers 3 is in the range of 1 to 300 mm. The fiber length should preferably be in the range of 10 to 100 mm, more preferably 5 to 30 mm. If the fiber length is less than 1 mm, the orientation of the reinforcing fibers will tend to deteriorate while flowing during the molding process, sometimes leading to a large deterioration in the mechanical properties.

If the fiber length is larger than 300 mm, on the other hand, the fiber length will be too large and the reinforcing fibers will tend to deteriorate in flowability, leading to a large variation in mechanical properties. If the fiber length is in the aforementioned range, however, the reinforcing fibers will be able to serve to achieve the desired reinforcing effect even if the reinforcing fibers in the FRP are discontinuous. Specific constructions of reinforcing fibers that are discontinuous and oriented in one direction are described later.

Third, the laminar additional resin layer 10 provided on at least one of the surfaces of the raw prepreg base a' in the composite prepreg base a serves to achieve very good molding characteristics (third effect).

One feature is that this effect is found to be enhanced very largely as a result of working in synergy with the second effect. If the reinforcing fibers 3 are discontinuous, it is not enough to allow the entire an raw prepreg base a' to be extended sufficiently during an FRP molding process. We found that the molding characteristics of the layered base b and the layered base d produced by laminating two or more raw prepreg bases a' depend largely not only on the extension of the entire the raw prepreg base a' alone, but also on the interaction (friction resistance at the interfaces 11a, 11b and 11c) between adjacent the laminated prepreg bases, and this finding led to the layered base b comprising two or more laminated composite prepreg bases a.

In FIG. 1, when a pressing pressure is applied to the layered base b from above in the downward direction, each layer becomes thinner, and the raw prepreg base a' is extended in the width direction of the reinforcing fibers 3 (the horizontal direction in the first and third layers, counted from the top). The difference in extension degree, acting as shearing force, is transmitted through the interfaces 11a, 11b and 11c to apply a load in the fiber direction of the reinforcing fibers 3 (the horizontal direction in the second and fourth layers, counted from the top).

As shown FIG. 2, the second and fourth layers are divided by this load in the central region into two in the horizontal direction, and the ends 4 of the adjacent discontinuous reinforcing fibers, which are in contact with each other in the case of the layered base b illustrated in FIG. 1, are separated with an interval 13. In particular, when a mold composed of the lower mold 12 and a upper mold is used for press molding to produce an FRP, the friction resistance between the raw prepreg base a' and the lower mold 12 also has large influence in addition to the above factors. The additional resin layers 10a, 10b, 10c and 10d located at the interface 11 and between the raw prepreg base a' and the lower mold 12 facilitate slippage of the raw prepreg base a' during the FRP molding process, leading to an increased flowability.

A very high flowability, shape followability and a wide range of molding conditions are realized by a synergistic effect based on the two-dimensional extension of the entire raw prepreg base a', and the interaction between adjacent composite prepreg bases a and between the composite prepreg base a and the mold.

The additional resin layer 10 that has effects as described above may be formed on either one or both of the surfaces of the raw prepreg base a'. The former may be preferable if the additional resin layer has to be introduced at low costs, while the latter is preferable if both surfaces of the composite prepreg base are equally used, without proper use each other.

It is more preferable to provide the layer on both surfaces because larger effects can be achieved.

In addition to the aforementioned effect, the use of the additional resin layer 10 serves to produce an FRP having well appearance quality and to bring effect of lessening voids (fourth effect).

When the interval 13 between the ends 4 of adjacent discontinuous fibers is widened to two-dimensionally extend the entire an raw prepreg base a' as shown in FIG. 5, the matrix resin would not normally be expected to exist in the gap 13a in the reinforcing fibers 13 that results from the increased interval 13 between the ends 4 of adjacent discontinuous fibers. Thus, the matrix resin will be squeezed out of other portions into the gap 13a, or the adjacent layer will move to fill the gap 13a.

However, it is not easy to squeeze out the matrix resin into the gap 13a or move the adjacent layers into it, and in conventional a prepreg bases (for instance, the raw prepreg base described in JP 63-247012 A), therefore, the gap 13a is not easily filled with the resin sufficiently, and voids 14 tend to be formed in the gap 13a. If such voids 14 exist in the surface of the molded FRP, they not only lead to the FRP with heavily poor appearance quality, but also cause stress concentration in the portions containing the voids 14 when a load is applied to the FRP, resulting in fatal defects such as deterioration in the mechanical characteristics of the FRP. If the adjacent layers enter the gap 13a, on the other hand, the laminated layers will suffer undulations, leading to deterioration in the physical properties of the FRP.

Compared to this, if the additional resin layer 10 is formed on at least one of the surfaces of the raw prepreg base a' as shown in FIG. 2, the resin in the additional resin layer 10 will be supplied to (flow into) the gap 13a that results from an increase in the interval 13 between the ends 4 of adjacent discontinuous reinforcing fibers 3, to completely prevent the formation of voids 14 such as illustrated in FIG. 5. Thus, the additional resin layer 10, in place of the matrix resin, acts as the supply source of resin to prevent the formation of the voids 14. This is because causing the resin constituting the additional resin layer to flow is much easier than squeezing out the matrix resin. The finding that such an additional resin layer can serve very effectively for improvement in appearance quality of an FRP and reduction of voids in the FRP.

Other notable effects include, in particular, the improvement of an FRP's tensile strength that can be achieved by the use of such an additional resin layer (fifth effect). Since the composite prepreg base a is composed of discontinuous reinforcing fibers 3, destruction is normally expected to start at the ends 4 of the discontinuous fibers where the reinforcing fibers 3 are separated. Conventionally, therefore, such products tend to be low in tensile strength compared to those comprising continuous reinforcing fibers.

On the other hand, if the additional resin layer has a high fracture toughness (Mode I fracture toughness $G_{IC}$ of a resin itself constituting the additional resin layer, Mode II fracture toughness $G_{IIC}$ of an FRP produced from the composite prepreg base comprising the additional resin layer), in particular, it acts to minimize the generation and expansion of initial cracks that can occur at the ends of severed reinforcing fibers and/or, even if initial cracks have taken place, it serves to reduce the progress of separation of interfaces that connect the ends of discontinuous reinforcing fibers with the ends of other discontinuous reinforcing fibers (such as those in the adjacent layers). Therefore, the destruction starting at the ends of the discontinuous reinforcing fibers can be minimized by using the additional resin layer that comprises resin having appropriate fracture toughness. As a result, it becomes possible to allow the FRP to have a higher tensile strength. The finding that the use of the additional resin layer serves very effectively to improve the tensile strength.

The resin used in the additional resin layer may be the same as the matrix resin. From the viewpoint of the compatibility between the additional resin layer and the matrix resin, the selection of an appropriate resin composition for a composite prepreg base can be simplified, making it possible to streamline the production process.

On the other hand, the aforementioned third and fourth effects are maximized if the additional resin layer comprises a resin that is lower than the matrix resin in the minimum viscosity in the range from room temperature to the decomposition temperature (hereinafter, simply referred to as minimum viscosity). If the matrix resin in the raw prepreg base is a thermosetting resin, the range from room temperature to its decomposition temperature is normally from about 80° C. to about 150° C. The use of an additional resin layer that comprises a resin having a lower viscosity than the matrix resin is advantageous.

Specifically, it is preferable that the minimum viscosity of the resin constituting the additional resin layer is ⅘ or less of that of the matrix resin. It should more preferably be ⅔ or less, still more preferably ½ or less. If the minimum viscosity is too low, the additional resin layer will possibly flow out, failing to achieve the third and fourth effects.

From this viewpoint, the minimum viscosity should preferably be 1/500 or more of the matrix resin. It should more preferably be 1/100 or more. As a matter of course, when selecting a resin to be used to constitute the additional resin layer, its adhesiveness and compatibility with the matrix resin should be examined, and for instance, a combination of a high-viscosity resin with a low-viscosity one of the same resin species is preferable. If the viscosity of the matrix resin is sufficiently low, however, it is not necessary for the viscosity of the additional resin layer to be lower than that of the matrix resin, and even if it is higher than the viscosity of the matrix resin, it will be highly possible to achieve a good effect.

The minimum viscosity of a resin is determined from curves showing the relation between a temperature and a viscosity in the range from room temperature to a decomposition temperature of a resin under the conditions of a heating rate of 2° C./min, a vibration frequency of 0.5 Hz, and use of parallel plates (diameter 40 mm). The measuring equipment was an expansion-type ARES viscoelasticity measuring system supplied by Rheometric Scientific Inc. The decomposion temperature of the resin is determined with the thermogravimetric (TG) analysis method where the resin was heated in a nitrogen atmosphere at a rate of 10° C./min to determine the temperature at which the thermal weight loss reaches 30%.

From another viewpoint, the fifth effect can be maximized if the resin constituting the additional resin layer has a higher fracture toughness (Mode I fracture toughness $G_{IC}$ of a resin itself constituting the additional resin layer, and Mode II fracture toughness $G_{IIC}$ of an FRP produced from the composite prepreg base comprising the additional resin layer) than that of the matrix resin. The use of an additional resin layer comprising a resin having a higher fracture toughness than that of the matrix resin is advantageous. For instance, such a relation can be achieved by using a combination of a high-ductility resin with a low-ductility one of the same resin species, or a combination of an additional resin layer containing a filler as described later and a matrix resin free of fillers.

If the fracture toughness of the matrix resin is sufficiently high, it is not necessary for the resin constituting the additional resin layer to have a very high fracture toughness, but the good effect can be achieved to a sufficient degree even if its fracture toughness is lower than that of the matrix resin. From this viewpoint, the Mode I fracture toughness $G_{IC}$ of the resin constituting the additional resin layer should preferably be 150 J/m² or more, more preferably 250 J/m² or more, still more preferably 450 J/m² or more. There are no specific upper limits to the fracture toughness $G_{IC}$ when considered separately, meaning that the higher the better. In general, however, the fracture toughness $G_{IC}$ is in a trade-off relation with the heat resistance, and from this viewpoint, it is preferable that the fracture toughness $G_{IC}$ should preferably be 1 kJ/m² or less to maintain a heat resistance of 100° C. or more.

For FRP produced from a composite prepreg base comprising an additional resin layer, the fracture toughness $G_{IIC}$ of the Mode II should preferably be 1 kJ/m² or more, more preferably 1.5 kJ/m² or more, and still more preferably 2 kJ/m² or more. There are no specific upper limits to the fracture toughness $G_{IIC}$ when considered separately, meaning that the higher the better. In general, however, the fracture toughness $G_{IIC}$ is in a trade-off relation with the heat resistance, and from this viewpoint, it is preferable that the fracture toughness $G_{IIC}$ should preferably be 5 kJ/m² or less to maintain a heat resistance of 100° C. or more.

The fracture toughness $G_{IC}$ of resin was calculated by the following procedure. Plates of cured resin (2±0.1 mm thickness, 10±0.5 mm width, 120±10 mm length) were used as test pieces. The tensile modulus E and Poisson's ratio ν of these test pieces were measured according to the method described in JIS K7161-1994 "Plastics—tensile characteristics test method." Similarly, $K_{IC}$ of plates of heat-cured resin (6±0.3 mm thickness, 12.7±0.3 mm width, 80±10 mm length) was measured according to ASTM D5045-99. The fracture toughness $G_{IC}$ was calculated from the tensile modulus E, Poisson's ratio ν, and $K_{IC}$ by the formula $((1-\nu)^2 \times K_{IC}^2)/E$. The number n of measurements made was 10 times. The fracture toughness $G_{IIC}$ of an FRP was determined based on ENF test (flexure test for end-notched test pieces) according to the method described in Appendix 2 to JIS K7086-1993 "Interlaminar fracture toughness test method for carbon fiber reinforced plastics." The number n of measurements made was 10 times.

The additional resin layer may cover the entire surface of the raw prepreg base, or may cover a part of the surface of the raw prepreg base. The additional resin layer covering the entire surface may, for instance, be in a form of resin film. The additional resin layer covering a part of the surface may, for instance, be in a form of fibrous material comprising a resin (such as nonwoven fabric, mat, net, mesh, woven fabric, knitted fabric, short fiber bundles, and continuous fiber bundles) or aggregates of particulate material composed of resin-based particles in a dispersed state.

The additional resin layer should preferably be such that the third or fourth effects are achieved to the highest possible degree. In particular, a resin film is preferable because these effects can be achieved economically and most effectively. A resin constituting the additional resin layer may be in a form of aggregates of particles when an FRP having a high content of reinforcing fibers is to be produced. In the case of aggregates of particles, it is possible not only to use a resin that is difficult to process into film, but also to largely reduce the quantity of resin required to form an intended additional resin layer.

When using particles, the average diameter of the particles should preferably be 1 mm or less, more preferably 250 μm or less, and still more preferably 50 μm or less, because the particles having a smaller average diameter (minor axis in the case of ellipsoidal particles) can be dispersed more uniformly over a surface of the raw prepreg base. The effect will level off as the particle size becomes extremely small, and from this viewpoint, the minimum required average particle diameter is 1 μm or more.

The thickness of the additional resin layer should preferably be in the range from the diameter of a single fiber in the reinforcing fibers to the 0.5 times of the thickness of the raw prepreg base. If the thickness of the additional resin layer is smaller than the diameter of the single fiber in the reinforcing fibers, the interface friction resistance will not be sufficiently high, sometimes failing to prevent the improvement in molding characteristics. If the thickness of the additional resin layer is larger than the 0.5 times of the thickness of the raw prepreg base, the fiber content of an FRP will be too small, sometimes failing to achieve a sufficient weight reduction. Specifically, if the reinforcing fibers are carbon fibers and the thickness of the raw prepreg base is in the common range of 0.1 to 0.6 mm, the thickness of the additional resin layer should preferably be in the range of 5 to 300 μm. It should more preferably be in the range of 10 to 80 μm, still more preferably 15 to 60 μm.

The thickness of the additional resin layer is determined by observing the cross section of the composite prepreg base with an optical microscope, measuring the height (thickness) at randomly selected 20 points, and averaging the measurements. If the resin that constitutes the additional resin layer is in the form of aggregates of fibrous or particulate material, 20 highest points where the resin forms domains should be selected randomly.

If the additional resin layer is in the form of a film layer, in particular, it is preferable that the additional resin layer contains a filler. Such a filler may be in the form of, for instance, particles (ellipse, sphere, perfect sphere and the like), flakes, scales, or discontinuous short fibers (chopped fiber, milled fiber). If the additional resin layer is in the form of a film layer, in particular, the filler to be used may be in the form of fibrous sheet (nonwoven fabric, mat, net, mesh, woven fabric, knitted fabric, continuous fiber bundles and the like).

If such a filler is contained, it acts like a log or roller used to move a heavy object (bearing effect) to largely reduce the friction resistance between adjacent a composite prepreg base layers or between the composite prepreg base and the mold, serving to further enhance the third or fourth effects. From this viewpoint, the filler should more preferably be spherical or perfectly spherical, and it is particularly preferable that they are in the form of hollow spheres in order to produce lightweight products. Specifically, the filler may be in the form of inorganic particles (particles of glass, carbon, mica, etc.), or resin particles (particles of phenol, polyamide, epoxy resin and the like).

If a filler that improves the fracture toughness of the additional resin layer itself is contained in the additional resin layer, it works to reduce the energy transfer/absorption and crack generation/expansion when an impact or a load is applied to the FRP. As a result, it prevents destruction at the interface between he composite prepreg bases to enhance the fifth effect.

From this viewpoint, the filler should preferably have a higher fracture toughness than the that of the resin constituting the additional resin layer and the matrix resin. Specifically, preferable materials include resin particles (particles of polyamide (particularly, polyamide 12), polyether sulfone, polyetherimide, polyamide-imide, polyether ether ketone, polyketone resin and the like).

The use of such resin particles allows the fracture toughness $G_{IC}$ of Mode I of the resin itself that constitutes the additional resin layer to be easily adjusted in the aforementioned range and to be increased the preferable range of 150 J/m² or more, and to the more preferable range of 250 J/m² or more. If greater importance is placed on the prevention of destruction at the interface between the composite prepreg bases rather than flowability, it is particularly preferable that the additional resin layer is in the form of a fibrous sheet (particularly, nonwoven fabric) because it serves to enhance the effect.

There are three typical forms of fiber sheets of reinforcing fibers that are discontinuous and oriented in one direction.

Form A: a sheet or tape of discontinuous reinforcing fibers produced by an appropriate spinning means such as a draft zone system spinning.

Form B: a sheet or tape of discontinuous reinforcing fibers (for instance, chopped fibers) oriented in one direction.

Form C: a fiber sheet produced by forming cuts having finite-length into a fiber sheet comprising continuous reinforcing fibers in which the cuts are provided on all over the fiber sheet in a direction across the reinforcing fibers.

According to Form A, it is able to form a fiber sheet having ends of single fibers in discontinuous reinforcing fibers each of which ends is not aligned and randomly arranged with each other, and therefore, the molding characteristics are slightly inferior, but very good mechanical characteristics and high quality stability can be achieved.

According to Form B, it is able to form a fiber sheet having ends of single fibers in discontinuous reinforcing fibers a plural of which ends are aligned and arranged somewhat regularly with each other, and therefore the quality stability is slightly inferior, but very good molding characteristics can be achieved.

According to Form C, it is able to form a fiber sheet having ends of single fibers in discontinuous reinforcing fibers a plural of which ends are aligned and arranged regularly, and therefore, good mechanical characteristics, high quality stability and good molding characteristics are all achieved in good balance.

Any of the aforementioned embodiments may be used to meet specific purposes, but Form C can be said to be the most preferable for the invention because mechanical characteristics and molding characteristics can be developed in good balance and its production is easy to perform. Thus, Form C is described in detail below with reference to drawings.

Figure 3:
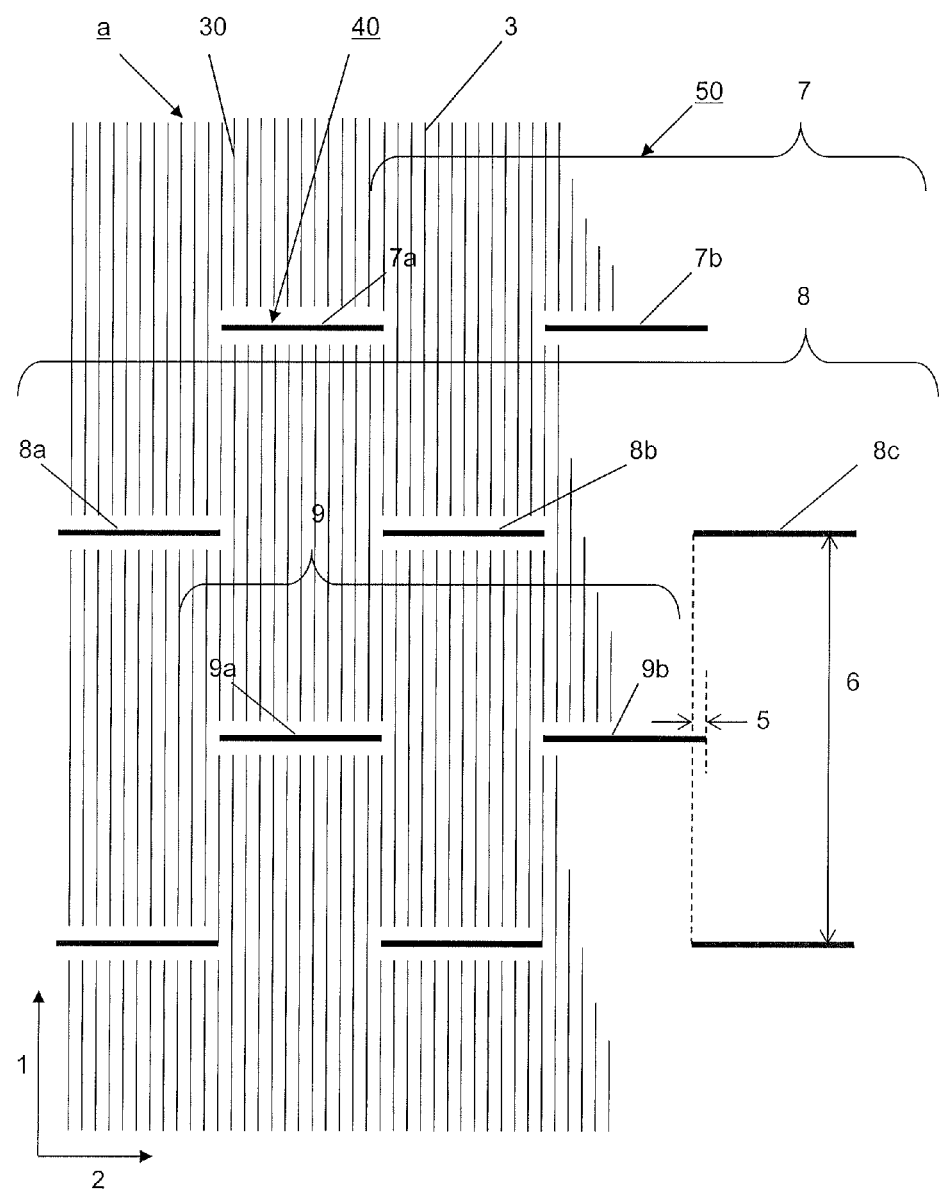
FIG. 3 shows a schematic plan view of an example of a raw prepreg base used for a composite prepreg base production process.

FIG. 3 shows a schematic plan view of an example of the composite prepreg base a of the invention produced based on Form C. FIG. 3 illustrates a typical cut arrangement pattern formed with many cuts 40 provided in many continuous reinforcing fibers 3 at intervals in a direction 2 across a fiber orientation direction 1 and the fiber orientation direction 1 in a fiber sheet 30 which comprises the many continuous reinforcing fibers 3 arranged in the fiber orientation direction 1, i.e. the top-bottom direction (longitudinal direction) in the figure. The many cuts 40 are formed with cut-rows 50 each of which consists of a plurality of cuts, arranged in the direction 2 across the fiber orientation direction 1 of the reinforcing fibers 3 at intervals as well as arranged in the fiber orientation direction 1 of the reinforcing fibers 3 at intervals.

Referring to FIG. 3 for detailed description, many cuts 40 are composed of a cut-row 7 comprising a plurality of cuts 7a and 7b aligned at intervals along the horizontal direction 2, a cut-row 8 comprising a plurality of cuts 8a, 8b and 8c aligned at intervals along the horizontal direction 2, and a cut-row 9 comprising a plurality of cuts 9a and 9b aligned at intervals along the horizontal direction 2. Many cut-rows 50 are formed with a plurality of cut-rows 7, 8 and 9. In one of the cut-rows 50, a required number of cuts 40 are aligned in the width direction of the fiber sheet 30, or are aligned over the entire width of the fiber sheet 30. A required number of cut-rows 50 are also aligned in the length direction of the fiber sheet 30, or are aligned over the entire length of the fiber sheet 30.

The relation between FIGS. 1 and 3 can be understood easily if attention is given to the fiber orientation direction of the reinforcing fibers 3 shown in the figures, and the plan view of the composite prepreg base a in FIG. 3 is assumed to be the plan view of the top layer that comprises the composite prepreg base a or the third layer (counted from the top) that comprises the composite prepreg base a in FIG. 3. The additional resin layer 10 is not included in FIG. 3 because it is located under the fiber sheet 30. Moreover, the matrix resin impregnated in the fiber sheet 30 is not shown either. The many cuts 40 and its arrangement pattern should preferably be as described in the following example.

Each of the cuts 40 put at intervals along each of the cut-rows 50 should preferably have a length of 2 to 50 mm. When a cut-row (for instance, the cut-row 7) is moved in the fiber orientation direction 1 of the reinforcing fibers 3 until the cuts on the cut-row first overlap those on another cut-row (for instance, the cut-row 9), the distance between the two cut-rows, i.e. the fiber length 6 of the reinforcing fibers 3 cut at the higher and lower ends by cuts (for instance, the cuts 7a and 9a), should preferably be in the range of 1 to 300 mm.

It is preferable that the positions of cuts (for instance, the cuts 7a and 8a) on two adjacent cut-rows (for instance, the cut-rows 7 and 8) are shifted in the perpendicular direction to the fiber orientation direction 1 of the reinforcing fibers 3, and that, when projected through in the fiber orientation direction 1 of the reinforcing fibers 3, cuts (for instance, the cuts 7a and 8a) on two adjacent cut-rows (for instance, the cut-rows 7 and 8) have an overlap with a length 5. The existence of this overlap with a length 5 allows the reinforcing fibers 3 to comprise bundles of many discontinuous fibers that are not continuous in the length direction (the fiber orientation direction 1) and have a prescribed length, for instance, a length in the range of 1 to 300 mm.

The composite prepreg base a shown in FIG. 3 has a pattern of cuts that comprises two types of cut-rows (for instance, the cut-rows 7 and 8) with cuts 40 in the same shape and direction, i.e. cuts 40 aligned in the perpendicular direction 2 to the orientation direction 1 of the reinforcing fibers 3, but there are no limitations on the pattern of cuts if the reinforcing fibers 3 are divided by cuts 40 into discontinuous bundles. If the cuts on two adjacent cut-rows are not shifted in the perpendicular direction 2 to the orientation direction 1 of the reinforcing fibers, some of the reinforcing fibers will be left uncut, sometimes leading to a large decrease in flowability.

In the composite prepreg base a shown in FIG. 3, it is preferable that the overlap length 5 in the overlaps between the cuts on two adjacent cut-rows should preferably be 0.1 mm or more, and smaller than 10% of the length of the shortest among the adjacent cuts in the same cut-row. An overlap length 5 of less than 0.1 mm is not preferable because reinforcing fibers that are left uncut and longer than the intended fiber length can be included, and such fibers will work to largely decrease the flowability. If the overlap length 5 of cuts is larger than 10% of the length of the shortest among the adjacent cuts, the ratio between the number of the fibers divided by a cut and that of the fibers among them that are divided by a cut on the adjacent cut-row, i.e. the proportion of the fibers shorter than the intended fiber length, will increase, leading to a molded FRP products having heavily poor mechanical properties and, therefore, it is not preferable. If some cuts located at the edge of the composite prepreg base do not have a full length, they are included in the shortest among the adjacent cuts, and in such a case, the inner cuts next to them are considered.

When the composite prepreg base a is produced according to Form C, it is preferable that all of the cuts 40 are in the same shape, size and direction. The good effect can be achieved if there are two or more types of cuts 40 that are in different shapes, sizes or directions, fibers can flow uniformly and the flow of the fibers can be controlled easily when all of the fibers have the same features. As a result, this prevents generation of warp in a molded FRP, and the control of the fiber orientations, i.e. appropriate setting of the fiber directions in a plurality of layers of laminated composite prepreg bases makes it possible to design an FRP product having desired mechanical properties.

When the composite prepreg base a is produced according to Form C, it is preferable that the cuts 40 are distributed consecutively at regular intervals in the perpendicular direction to the fibers. As in the case of the aforementioned shape, size and direction of cuts, fibers located at regular intervals will flow uniformly, allowing easy control of the flowability of fibers. As a result, this prevents the generation of warp in a molded FRP, and the control of the fiber orientations makes it possible to design an FRP product having desired mechanical properties.

When the composite prepreg base a is produced according to Form C, the shape of the cuts may be straight, curved, a combination of straight segments, or a combination of straight and curved segments. In the case of straight cuts, their directions may be diagonal or perpendicular to the fiber direction.

If a film-like additional resin layer is used in the composite prepreg base a produced according to Form C, in particular, it is preferable that the additional resin layer also have cuts at the same positions as those in the reinforcing fibers. Such cuts located at the same positions serves to allow the additional resin layer and the reinforcing fibers to flow harmoniously. Formation of cuts can allow air to gain in the raw prepreg base, but if the additional resin layer has cuts at the same positions, air in the raw prepreg base will be easily come out, preventing the formation of voids in a molded FRP product, which is also an advantage.

If the additional resin layer comprises aggregates of fibrous or particulate material, instead of film, the additional resin layer will be permeable to air, and therefore, the air contained in the raw prepreg base as a result of the formation of cuts can easily come out if the additional resin layer is free of cuts at the same positions as those in the raw prepreg base. Rather, it is preferable that the additional resin layer is free of cuts. If the additional resin layer is free of cuts and comprises continuous fibers, it will serve to prevent initial cracks from being formed in the portions where reinforcing fibers are divided by the cuts in the raw prepreg base, and minimize the expansion of initial cracks if they are formed. Even if initial cracks are formed, it will be possible to prevent interlaminar separation extending between the ends of discontinuous reinforcing fibers in the portions where the initial cracks are formed and the ends of other discontinuous reinforcing fibers, for instance, the ends of discontinuous reinforcing fibers in the adjacent layer. As a result, the fifth effect can be maximized. Needless to say, no problems will cause by an cut-free additional resin layer if the raw prepreg base does not contain air as a result of putting cuts in it.

When the composite prepreg base is produced according to Form A or Form B, on the other hand, the matrix resin may be impregnated in the discontinuous reinforcing fibers in the raw prepreg base before the start of a molding process. This eliminates the need for removing air through the additional resin layer or for putting cuts in the additional resin layer at the same positions as the ends of the discontinuous reinforcing fibers, and it will be preferable the additional resin layer does not have cuts. If the additional resin layer contains no cuts and comprises continuous fibers, the interaction (interface friction resistance) between adjacent laminated composite prepreg bases can be minimized to maximize the third and fifth effects.

In the composite prepreg base, particularly the composite prepreg base produced according to Form C, it is preferable that the many oriented reinforcing fibers are in close contact with a surface of a tape-like or sheet-like support. Rolling up the composite prepreg base can cause adhesion between surfaces of the rolled-up a composite prepreg base to make unrolling impossible, but this can be prevented by using a support with releasability, even if the matrix resin is a thermosetting resin having tackiness.

In particular, if the reinforcing fibers are divided by cuts as in the case of the composite prepreg base produced according to Form C, the support serves to maintain the shape of the composite prepreg base and prevent the reinforcing fibers from being removed and becoming unkempt during the shaping step in an FRP molding process. If the matrix resin is a thermosetting resin having tackiness, the adhesion of the support can be achieved by the self-adhesiveness of the matrix resin. If the matrix resin is a thermosetting resin free of tackiness, it is achieved by the self-adhesiveness of the additional resin layer.

Materials for such a tape-like or sheet-like support include, for instance, paper such as kraft paper and release paper, resin film such as polyethylene and polypropylene resin, and metal foil such as aluminum foil, and furthermore, a surface of the support may carry a silicone- or fluorine-base mold releasing agent or metal deposited film in order to have releasability for resin.

The composite prepreg base should preferably have a thickness of 0.03 to 1 mm. The thickness should more preferably be 0.04 to 0.15 mm, still more preferably 0.05 to 0.12 mm, and still more preferably 0.06 to 0.10 mm. If the thickness is less than 0.04 mm, the number of fibers divided by a cut inevitably becomes small, and undulation of fibers tends to results from the flow during a molding process. Furthermore, production of an FRP component having a thickness of 2 mm, for instance, requires a composite prepreg base composed of 100 or more laminated layers, which is not preferable in terms of production efficiency. If the thickness exceeds 1 mm, on the other hand, the layer will account for a large proportion of the total thickness of the laminate, which causes a large anisotropy, possibly leading to warp etc. of a molded component.

If the raw prepreg base is produced by preparing a prepreg base from continuous reinforcing fibers, followed by putting finite-length cuts at intervals over its entire surface in a direction across the reinforcing fibers as in the case of the composite prepreg base produced according to Form C, the cuts will penetrate through the thickness of the raw prepreg base, and therefore, a thinner a prepreg base will be more advantageous in terms of mechanical characteristics (in particular, tensile strength). From this viewpoint, the weight per unit area of the reinforcing fibers in the composite prepreg base should preferably be in the range of 30 to 300 $g/m^2$, more preferably 40 to 150 $g/m^2$, and still more preferably 60 to 100 $g/m^2$.

There are no specific limitations on the type of the reinforcing fibers and suitable materials include, for instance, carbon fiber, glass fiber, organic fiber (such as aramid fiber, poly(p-phenylene benzobisoxazole) fiber, polyethylene fiber, and polyvinyl alcohol fiber), metal fiber, ceramic fiber, and combinations of these fibers. Among others, carbon fiber, particularly polyacrylonitrile-based (PAN-based) carbon fiber, is high in specific strength and specific modulus, and also high in water absorption resistance and environmental resistance, and therefore, it is preferred as reinforcing fiber for structural elements of aircraft and automobiles that require high strength.

There are no specific limitations on the matrix resin if it serves as the raw prepreg base and can be molded into an FRP.

Suitable resins to be used to constitute the additional resin layer include thermoplastic resins, thermosetting resins, and their combinations that are selected appropriately. Specifically, they include the following:

If a thermoplastic resin is used as a resin constituting the additional resin layer, suitable ones include, for instance, polyester, polyolefine, styrene-based resin, polyoxy methylene, polyamide, polyurethane, polyurea, polydicyclopentadiene, polycarbonate, polymethylene methacrylate, polyvinyl chloride, polyvinyl formal, polyphenylene sulfide, polyphenylen ether, polyetherimide, polysulfone, polyallylate, polyether sulfone, polyketone, polyether ketone, polyether ether ketone, polyether ketone ketone, polyallylate, polyether nitrile, polyimide, polyamide-imide, phenol, phenoxy, polytetrafluoroethylene, other fluorine-based resins, elastomer (preferably, butadiene-acrylonitrile, carboxylic acid or amine modification of the former, fluoroelastomer, polysiloxane elastomer), rubber (such as butadiene, styrene-butadiene, styrene-butadiene-styrene, styrene-isoprene-styrene, natural rubber), resin for RIM (such as those containing catalysts to produce polyamide 6, polyamide 12, polyurethane, polyurea, or polydicyclopentadiene), cyclic oligomer (such as those containing catalysts to produce polycarbonate resin, polybutylene terephthalate resin and the like), and other resins such as copolymer of the former, modification of the former, and blend of two or more of the former. Among them, particularly preferable are polyamide, polyester, polyolefin, polyvinyl formal, and polyphenylen sulfone, because of a good balance between resin characteristics and cost, and degree of design freedom for resin viscosity.

If a thermosetting resin is used as a resin constituting the additional resin layer, suitable ones include, for instance, epoxy, phenol, polybenzimidazole, benzoxazine, cyanate ester, unsaturated polyester, vinyl ester, urea, melamine, bis-maleimide, acrylic, polyimide, polyamide-imide, etc., and other resin such as copolymer of the former, modification of the former and blend of two or more of the former, and still other resins containing elastomer component, rubber component, curing agent, cure accelerator, catalyst, etc. These resins should preferably be have a viscosity of $1 \times 10^6$ Pa·s or less at room temperature (25° C.), and if the viscosity is in this range, the resin can serve to produce a composite prepreg base with intended tackiness and drape property.

If a resin constituting the additional resin layer is a thermosetting resin, the composite prepreg base will have tackiness at room temperature. When laminating the bases, therefore, these bases are integrated by adhesion, and they can be molded while maintaining an intended lamination composition, thus constituting a good embodiment of the invention. With a large degree of design freedom in terms of resin viscosity, the minimum viscosity can be easily met in carrying out viscosity design, making it possible to maximize the effect of the invention.

From the viewpoint described above, the resin that constitutes a film-like additional resin layer should preferably be a resin composition comprising a thermosetting or thermosetting resin as primary component. Needless to say, the intended effect can also be achieved when the additional resin layer comprises aggregates of fibrous or particulate material, though a film-like layer can maximize the effect.

If the resin that constitutes the additional resin layer is thermoplastic resin, on the other hand, a film-like additional resin layer will not have tackiness at room temperature, and therefore, the aforementioned effect will not be achieved as in the case of thermosetting resin. If comprising aggregates of fibrous or particulate material, the additional resin layer will have good features that are characteristic of thermoplastic resin, such as high ductility, high adhesiveness (thermoplasticity) and ability to form an FRP having high strength.

The matrix resin should preferably be a thermosetting resin or a resin composition comprising a thermosetting resin as primary component (which hereinafter may be simply referred to as a thermosetting resin). A matrix resin that is a thermosetting resin or a resin composition comprising a thermosetting resin as primary component will have good drape property at room temperature, and therefore, in cases where, for instance, a complex-shaped mold having ribbed irregular-shaped portions or quadric surfaces has to be used for a molding, preliminary shaping can be easily performed to give a complex contour shape to the resin before the molding. Such preliminary shaping serves to increase the molding characteristics and makes flow control easier.

If the matrix resin is a thermoplastic resin, it will be difficult to perform preliminary shaping at room temperature. Thermosetting resins generally have tackiness, and the overall shape can be maintained if all reinforcing fibers are divided by cuts, making it possible to easily prevent reinforcing fibers from being removed and becoming unkempt during shaping. The primary component as referred to herein is defined as the component that accounts for more than 50% of the composition.

In these thermosetting resins, epoxy is particularly preferable. Epoxy, when used as matrix resin, show high adhesiveness and can achieve strong adhesion and tackiness between bases, and furthermore, the matrix resin comprising epoxy will show particularly good high mechanical characteristics.

If the matrix resin is a thermoplastic resin, on the other hand, the composite prepreg bases, when laminated, will easily slip on each other to cause a shift between them during a molding process because thermoplastic resins are generally free of tackiness at room temperature, resulting in an FRP products having a large variation in fiber orientation. In particular, such a variation can be very large in FRP products of a complicated shape having irregular-shaped portions.

It is preferable that the matrix resin of the raw prepreg base is a thermosetting resin while the additional resin layer comprises a thermoplastic resin. FRP products having a largely improved strength can be produced by using a thermosetting resin having high adhesiveness with reinforcing fibers, high dimensional stability, high heat resistance and creep resistance as the matrix resin of the raw prepreg base that account for a large proportion of the total resin quantity while providing high-ductility thermoplastic resin as interlayers. If, thermoplastic resin in the form of fiber (such as nonwoven fabrics in particular,) or particles is used as the additional resin layer, furthermore, the thermosetting matrix resin will ooze out to develop tackiness between bases.

A composite prepreg base such as those described in detail above, specifically a composite prepreg base that comprises a prepreg base produced from a fiber sheet composed of discontinuous reinforcing fibers having a fiber length in the range of 1 to 300 mm aligned in one direction and the matrix resin impregnated into the fiber sheet, combined with an additional resin layer formed over at least one of the surfaces of the prepreg base, can be produced by the production process 1, production process 2 or production process 3 described below.

Production process 1:

A composite prepreg base production process comprising the steps of:
(1-a) preparing a prepreg base comprising a fiber sheet of continuous reinforcing fibers arranged in one direction and a matrix resin impregnated at least partly into the fiber sheet,
(1-b) forming an additional resin layer on at least one of the surfaces of the prepreg base prepared in the step (1-a), and
(1-c) forming cuts into the prepreg base having the additional resin layer formed in the step (1-b) to form discontinuous reinforcing fibers having a fiber length of 1 to 300 mm from the continuous reinforcing fibers.

Production process 2:

A composite prepreg base production process comprising the steps of:
(2-a) preparing a prepreg base comprising a fiber sheet of continuous reinforcing fibers arranged in one direction and a matrix resin impregnated at least partly into the fiber sheet,
(2-b) forming cuts into the prepreg base prepared in the step (2-a) to form discontinuous reinforcing fibers having a fiber length of 1 to 300 mm from the continuous reinforcing fibers, and
(2-c) forming an additional resin layer on at least one of the surfaces of the prepreg base having the discontinuous reinforcing fibers having the fiber length of 1 to 300 mm prepared in the step (2-b).

Production process 3:

A composite prepreg base production process comprising the steps of:
(3-a) preparing a fiber sheet of discontinuous reinforcing fibers having a fiber length of 1 to 300 mm and arranged in one direction, wherein the edges of the fibers having the fiber length are located at different positions in the length direction,
(3-b) forming a prepreg base by impregnating a matrix resin at least partially into the fiber sheet prepared in the step (3-a), and
(3-c) forming an additional resin layer on at least one of the surfaces of the prepreg base formed in the step (3-b).

In all production processes, the additional resin layer is prepared separately from the raw prepreg base, and this makes it possible to produce an additional resin layer having a stable thickness and to lay it precisely on the surface of the raw prepreg. The stable thickness of the additional resin layer serves to achieve a required flowability and strength stably during a molding process, making it possible to produce a composite prepreg base having high quality stability.

Even if the same resin is used for the matrix resin of the raw prepreg base and the additional resin layer, it will be possible in some cases to concentrate the resin on a surface of the prepreg base by supplying excessive quantities of the matrix resin when preparing the raw prepreg base. If the matrix resin is a thermosetting resin, however, this will result only in an overall increase of the resin content in the raw prepreg base, failing in stable concentration of the resin on the surface. The effect of the invention will not be achieved if the resin is not concentrated on the surface.

If the matrix resin is a thermoplastic resin, it will be so high in viscosity that it will not be impregnated smoothly into the reinforcing fibers, and therefore, it will be easily concentrated on the surface. But in such cases, it will be very likely that the concentration of the resin on a surface results in some unimpregnated portions being left in the prepreg base. If unimpregnated portions are left in the prepreg base before a molding process and in addition, a thermoplastic resin having a high viscosity is used as the matrix resin, it will be difficult to eliminate these unimpregnated portions during an FRP molding process. If the matrix resin is supplied in excessive quantities for concentration of the resin on a surface of the prepreg base, on the other hand, the process stability will be low, and only the thickness of the resin layer on the surface will tend to fluctuate to cause meandering of fibers, which is not desirable.

Suitable methods to put cuts in the production steps (1-c) or (2-b) include the use of a cutter by hand, the use of a cutting machine or a punching machine for mechanical operations, and the use of rotating roller blades etc. provided at predetermined positions to perform continuous cutting during the preparation of a raw prepreg base composed of continuous fibers. The use of a cutter by hand is suitable if simple operation is desired for putting cuts in the prepreg base while the use of a cutting machine, punching machine, rotating roller blades etc. is suitable for large-scale production with high production efficiency.

The layered base comprises a laminate of two or more plates of the composite prepreg base wherein the plates of the composite prepreg base are integrated by at least partial adhesion and an additional resin layer is formed on at least one of the surfaces of the layered base surface.

In a layered base, it is preferable that the matrix resin of the raw prepreg base is thermosetting resin while the additional resin layer comprises thermoplastic resin, with the thermoplastic resin exposed at a surface of the layered base. The use of the thermosetting resin as the matrix resin ensures adhesiveness with the reinforcing fibers, as well as the dimensional stability, heat resistance and creep resistance, while high-ductility thermoplastic resin exists at the ends of the discontinuous reinforcing fibers on the surface that are likely to act as the starting points of destruction, serving very effectively to produce FRP products having highly improved strength.

The use of a thermoplastic resin in a form of fiber (such as a nonwoven fabric in particular,) or particles as an additional resin layer allows the thermosetting matrix resin to ooze out to develop tackiness on the surface of the layered base. Production of a layered base will also be easy when an additional resin layer comprising a thermoplastic resin in a form of fiber (in particular, a nonwoven fabric being preferable) or particles is provided particularly between layers in the layered base, because the composite prepreg base will have tackiness. Furthermore, when an FRP product is joined to another FRP product, the additional resin layer of the FRP product is adhered strongly to the other FRP product into an integrated body particularly in the case where the other FRP product comprises a thermoplastic matrix resin. This example can be said to be an unexpected advantage.

Another example is a layered base comprising reinforcing fibers and a matrix resin wherein two or more raw prepreg bases composed of discontinuous reinforcing fibers oriented in one direction with an additional resin layer provided at least at one of the interfaces between the laminated layers, and two adjacent raw prepreg bases and/or an raw prepreg base and an adjacent additional resin layer are adhered at least partly to integrate them into a layered base, with an additional resin layer being provided on at least one of the surfaces.

As described previously, integrating composite prepreg bases will have a handleability during an FRP molding process and can be molded into an intended FRP product while maintaining a designed laminate structure. If the matrix resin is thermosetting resin in this case, its tackiness serves to easily integrate two or more composite prepreg bases.

There are no specific limitations on the laminate structure of the composite prepreg bases in the layered base if the laminate is properly structured to meet the requirements for an intended FRP product. In particular, uniform mechanical properties can be achieved and warp in the FRP is prevented if the laminate has a quasi-isotropic structure such as [−45/0/+45/90]$_s$ and [+60/0/−60]$_s$.

The additional resin layer in the layered base may be provided on only one surface or both surfaces of the layered base. It should preferably be provided on both surfaces in consideration of the friction resistance between the composite prepreg base and the mold during an FRP molding process. The additional resin layer is not necessarily at all interfaces between adjacent the raw prepreg bases in the layered base, but should be provided only at the interfaces where it is required. To maximize the effect, it is preferable an additional resin layer is provided at all interfaces. A layered base in which an additional resin layer is provided on both surfaces and at all interfaces can be said to constitute the most preferable form because it can have excellent molding characteristics.

It is preferable that an additional resin layer is provided at two or more interfaces between adjacent raw prepreg bases that these additional resin layers have different thicknesses. It is more preferable that thick and thin additional resin layers coexist at the interfaces in the layered base. Better molding characteristics can be achieved and voids can be prevented from being formed around the ends of discontinuous reinforcing fibers if a thicker additional resin layer is provided at interfaces where the raw prepreg bases must slip most largely and in the portions where the entire raw prepreg base must be extended most largely in the orientation direction of the reinforcing fibers.

If an additional resin layer is provided both at the interface between two adjacent raw prepreg bases and at least one of the surfaces of the layered base, it is preferable the additional resin layer provided at the surface of the layered base is thicker than that at the interface. This is because at the interface between two adjacent raw prepreg bases, the raw prepreg base exists on both sides of the interface to supply resin easily while at the outermost face of the layered base, the raw prepreg base exists on only the upper or lower side, leading to less amounts of resin supply. This is preferable in order to produce FRP products having high surface quality.

An FRP is produced by heating and pressing the layered base and comprises a layered base and an additional resin layer formed on at least one of its surfaces. The good effect is maximized by molding the composite prepreg base and a layered base by heating and pressing. The flowability of the surface layer of the layered base can be increased and a high-quality FRP can be obtained by providing an additional resin layer on the surface. As described later, this also makes it possible to produce an FRP having high adhesiveness to other FRP products.

The FRP is used preferably to produce a shaped product comprising the FRP carrying at its surface an additional resin layer adhered to another FRP material or another thermoplastic resin molding to form an integrated structure. The FRP has an additional resin layer on its surface, and therefore, it can be combined strongly and easily with another FRP material or another thermoplastic resin with the additional resin layer acting in between. Adhering another FRP material to the surface of the FRP serves to develop functions that cannot be achieved by the FRP alone, such as for producing products of a complicated shape, Class A surfaces for automobiles, and other surfaces of extremely high surface quality.

Specifically, preferable embodiments include products where the additional resin layer in the FRP and the matrix resin in the another FRP material are thermoplastic resin. If both are thermoplastic resin, extremely high adhesive strength attributed to their thermoplasticity can be achieved to serve for strong and easy adhesion between the FRP and the another FRP material.

More preferably, the matrix resin of the FRP is a thermosetting resin while the additional resin layer comprises a thermoplastic resin, with the thermoplastic resin being exposed at a surface of the layered base, and in addition, the matrix resin of the other FRP is a thermoplastic resin. If a very complicated shape is intended, it is preferable that the other FRP is an injection-molding product composed of discontinuous reinforcing fibers that are randomly dispersed.

In the FRP, it is preferable that the gaps between ends of adjacent discontinuous reinforcing fibers are filled with the resin that constitutes the additional resin layer. In such an example, it will be possible to decrease the void fraction and undulation of the layers while increasing the elastic modulus as well as the strength. At the surface of the FRP, furthermore, the formation of shallow depressions around the ends of discontinuous reinforcing fibers can be prevented to provide an FRP having improved surface quality.

For the FRP, it is preferable that the layered base is shaped and solidified, and as described later, molded into a shape having ribs or quadric surfaces. The use of the composite prepreg base and the layered base is of particular significance when producing FRP moldings of a complicated shape having ribs or quadric surfaces, and this is one of the very problems to be solved by the invention.

Suitable FRP production methods for the composite prepreg base or the layered base include press molding, autoclave molding and sheet winding molding. In particular, press molding preferable because high production efficiency can be achieved. Specifically, the thickness of the layered base is decreased by press molding, leading to thinner layers. As layers become thinner, the thickness of the ends of discontinuous reinforcing fibers will decrease, which further prevents crack formation and interlaminar separation, resulting in an FRP having improved strength. It also serves to minimize the formation of voids.

To carry out such press molding to produce void-free FRP products having good appearance quality that have a complicated shape having ribs or quadric surfaces, it is preferable to press the layered base in a mold of a shape having ribs and/or quadric surfaces. The layered base is designed to achieve the first to fourth effects and, therefore, void-free FRP products of a complicated shape having ribs or quadric surfaces can be produced by simply pressing it in the mold.

Suitable uses of the composite prepreg base and the layered base, and the FRP produced from them, include structural elements that have a complicated shape containing ribs and quadric surfaces, such as those of transport equipment (automobile, aircraft, naval vessels etc.), industrial machines, precision equipment and sports equipment (bicycle etc.). Particularly suitable uses include the crank and frame of bicycles, head of golf clubs, door and sheet frame as structural elements of automobiles, and robot arm as structural elements of industrial machines.

Our FRPs and methods are described more specifically below by referring to examples, though they are not intended to place any limitations on this disclosure.

In the examples, when a composite prepreg base a is produced by applying an additional resin layer to a prepreg base comprising a fiber sheet of continuous reinforcing fibers oriented in one direction and a matrix resin impregnated in the fiber sheet, followed by putting cuts in the continuous reinforcing fibers, the prepreg base comprising continuous reinforcing fibers and carrying an additional resin layer is referred to as a preliminary prepreg base.

On the other hand, when a composite prepreg base a is produced by preparing a prepreg base comprising a fiber sheet of discontinuous reinforcing fibers having a fiber length of 1 to 300 mm oriented in one direction and a matrix resin impregnated into the fiber sheet, followed by applying an additional resin layer, the prepreg base comprising discontinuous reinforcing fibers is referred to as a raw prepreg base.

<Evaluation Method for Flowability>

Pieces having a diameter of 100 mm are cut out of the composite prepreg base. A layered product is prepared by laminating eight pieces of the composite prepreg base in a quasi-isotropic manner. The layered product has a laminate structure of $[-45/0/+45/90]_{1S}$. The layered product is then placed on a flat plate mold of 300×300 mm, and cured the resin at 150° C. for 30 minutes under a pressure of 6 MPa in a heater-type press molding machine. The ratio of a diameter L (in mm) of the resulting FRP to the original diameter of 100 mm is calculated. The formula for calculating of the ratio is described as L/100 mm. For the diameter L (in mm) of the resulting FRP, measurements are taken from the outmost composite prepreg base layers, and the larger one is used as the diameter L. If the outmost a composite prepreg base layers flow and deform into an ellipse, then the largest of the major axis measurements is used as the diameter L. The ratio calculated is then used to evaluate the flowability.

<Evaluation Method for Rib Moldability>

From the composite prepreg base, 80 mm×80 mm pieces either in the same direction as the orientation direction of the reinforcing fibers (0° direction) or in the direction inclined by 45° from the orientation direction of the reinforcing fibers (45° direction) are cut out. A layered product is prepared by laminating eight pieces of the composite prepreg base in a quasi-isotropic manner. The layered product has a laminate structure of $[-45/0/+45/90]_{1S}$. A mold composed of a 100× 100 mm upper mold having a cavity of 1.5 mm wide, 100 mm long and 15 mm deep provided in the bottom face and a lower mold having a flat top face is prepared. The layered product is placed on the top face of the lower mold, and the upper mold is put in place, followed by curing the resin in a heater-type press molding machine at 150° C. for 30 minutes under a pressure of 6 MPa. The height of the rib formed in the resulting FRP is measured. The height measurements are then used to evaluate the rib moldability.

<Evaluation Method for Mechanical Characteristics>

Test pieces for tensile strength having a length of 250±1 mm and width of 25±0.2 mm are cut out of a flat plate FRP. The tensile strength is measured according the test method specified in JIS K7073-1988 "Tensile test method carbon fiber reinforced plastics" under the conditions of a gage length of 150 mm and a crosshead travel rate of 2.0 mm/min. A Model 4208 Instron (registered trademark) type universal tester is used for the testing in the Examples. The number n of test pieces subjected to measurement is 10, and the average for them is used as the value of tensile strength. Furthermore, the standard deviation is calculated from the measurements, and the standard deviation is then divided by the average to determine the variation coefficient CV (%), which indicates the degree of variation.

<Evaluation Method for Minimum Viscosity of a Resin>

The minimum viscosity is determined from the relational curve for temperature and viscosity under the conditions of a heating rate of 2° C./min, vibration frequency of 0.5 Hz and use of parallel plates (40 mm diameter). An expansion-type ARES viscoelasticity measuring system supplied by Rheometric Scientific Inc. is used for measurement in the Examples.

<Evaluation Method for Thickness of an Additional Resin Layer>

The cross section is observed directly with an optical microscope (400 magnifications) to determine the thickness.

<Evaluation Method for $G_{IC}$ of a Matrix Resin>

Plates (2±0.1 mm thickness, 10±0.5 mm width, 120±10 mm length) are cut out of a cured resin and used as test pieces. The tensile modulus E and Poisson's ratio ν of the test pieces are measured according to the method specified in JIS K7161-1994 "Plastics—Test method for tensile characteristics." Similarly, the $K_{IC}$ is measured for the plates of heat-cured resin (6±0.3 mm thickness, 12.7±0.3 mm width and 80±10 mm length) according to ASTM D5045-99. The value of $G_{IC}$ is calculated from the measurements of the tensile modulus E, Poisson's ratio ν and $K_{IC}$ by the formula $((1-\nu)^2 \times K_{IC}^2)/E$. The times n of measurements is 10.

<Evaluation Method for $G_{IIC}$ of an FRP>

To take measurements, the ENF test (flexure test for end-notched test pieces) is carried out according to the method specified in Appendix 2 to JIS K7086-1993 "Interlaminar fracture toughness test method for carbon fiber reinforced plastics." The times n of measurements is 10.

EXAMPLE 1

In a kneader, an epoxy resin (30 parts by weight of "Epikote (registered trademark)" 828, 35 parts by weight of "Epikote (registered trademark)" 1001, and 35 parts by weight of "Epikote (registered trademark)" 154, manufactured by Japan Epoxy Resins Co., Ltd.), 5 parts by weight of a thermoplastic resin of polyvinyl formal (Vinylec K (registered trademark) manufactured by Chisso Corporation), 3.5 parts by weight of a dicyandiamide curing agent (DICY7 manufactured by Japan Epoxy Resins Co., Ltd.), and 4 parts by weight of a curing accelerator 3-(3,4-dichlorophenyl)-1, 1-dimethyl urea (DCMU99 manufactured by Hodogaya Chemical Co., Ltd.) were heat-kneaded to prepare an epoxy resin composition 1, which was uncured material containing polyvinyl formal dissolved uniformly. The epoxy resin composition 1 was spread over a release paper with a reverse roll coater to prepare a resin film 1 of 19 g/m².

Then, the resin film 1 was laid on both sides of carbon fibers (tensile strength of 4,900 MPa, tensile modulus of 235 GPa) 3 oriented in one direction, followed by heating and pressing (130° C., 0.4 MPa) for impregnation of the resin to prepare a prepreg base 1 having a carbon fiber unit weight of 120 g/m², a matrix resin content of 24 wt %, and a prepreg base thickness of 0.12 mm.

The same material as the uncured epoxy resin composition 1 was spread over a release paper with a reverse roll coater to prepare a resin film (a resin unit weight of 19 g/m², and a film thickness of 0.02 mm), which, used as an additional resin layer 10, was applied to one side of the prepreg base 1 to prepare a preliminary prepreg base 1 (a resin content of 32 wt %, a prepreg base thickness of 0.14 mm).

Subsequently, cuts were put continuously in the resulting preliminary prepreg base 1 as shown in FIG. 3 using an automatic cutting machine to produce a composite prepreg base 1 having regularly arranged cuts 40 aligned at equal intervals.

The cuts 40 are put in the perpendicular direction 2 to the orientation direction 1 of the fibers 3, and the length of the cuts 40 and the fiber length 6 of the fibers 3 after being cut are 10.5 mm and 30 mm, respectively. Adjacent cut-rows 50 are shifted by 10 mm in the direction 2 perpendicular to the orientation direction 1 of the fibers 3. Thus, there are two types of patterns of cuts in many cut-rows 50. Furthermore, the cuts 40 in the adjacent cut-rows 50 extend 0.5 mm each other. The number of fibers 3 cut by each cut is 18,900.

The epoxy resin composition 1 had a minimum viscosity of 5.5 Pa·s, and the composite prepreg base 1 had tackiness. A cured product (130° C., 90 min) of the epoxy resin composition 1 itself had a Mode I fracture toughness $G_{IC}$ of 174 J/m².

From the composite prepreg base 1 produced, 250×250 mm pieces either in the same direction as the orientation direction of the carbon fibers 3 (0° direction) or in the direction shifted by 45° from the orientation direction of the carbon fibers 3 (45° direction) are cut out. Sixteen cut out composite prepreg bases 1 are laminated in a quasi-isotropic manner in such a way that the face of a base that carries the additional resin layer 10 comes in contact with the face of the adjacent base that is free of the additional resin layer, providing a layered base 1. The laminate structure was $[-45/0/+45/90]_{1S}$. The layered base 1 had a thickness of 2.2 mm. The layered base 1 was then placed on a flat plate mold of area of 300×300 mm, and cured the resin at 150° C. for 30 minutes under a pressure of 6 MPa in a heater-type press molding machine to provide a flat plate FRP having an area of 300×300 mm and a thickness of 1.6 mm.

The resulting flat plate FRP was free of undulation of carbon fibers, and the carbon fibers had flowed uniformly and sufficiently to the edge of the FRP. It was free of warp, and had a highly smooth flat surface. The flowability was 1.3, and the height of the ribs formed was 10 mm. The tensile strength of the FRP was 390 MPa, and the variation coefficient CV was as small as 6%.

In addition, 10 trays that had a width of 80 mm, length of 160 mm, wall height of 20 mm and quadric surface having a curvature radius (R) of 3 mm were produced successively under the same molding conditions as above. In the resulting trays, all quadric portions and all gaps between the ends of adjacent discontinuous carbon fibers, even in the outermost face, were completely filled with the resin without leaving empty spaces, and the wall portions were also free of creases, indicating that the FRP products produced had high appearance quality. The fact that high quality FRP products were obtained in all the 10 molding runs proved their high quality stability.

EXAMPLE 2

In a kneader, an epoxy resin (9 parts by weight of "Epikote (registered trademark)" 828, 35 parts by weight of "Epikote (registered trademark)" 1001, 20 parts by weight of "Epikote (registered trademark)" 1004, and 36 parts by weight of "Epikote (registered trademark)" 807, manufactured by Japan Epoxy Resins Co., Ltd.), 5 parts by weight of a thermoplastic resin of polyvinyl formal (Vinylec K (registered trademark) manufactured by Chisso Corporation), 4.5 parts by weight of a dicyandiamide curing agent (DICY7 manufactured by Japan Epoxy Resins Co., Ltd.), and 3 parts by weight of a curing accelerator 3-(3,4-dichlorophenyl)-1,1-dimethyl urea (DCMU99 manufactured by Hodogaya Chemical Co., Ltd.) were heat-kneaded to prepare an epoxy resin composition 2 (resin minimum viscosity 3.4 Pa·s), which was uncured material containing polyvinyl formal dissolved uniformly.

Using this epoxy resin composition 2, the same procedure as in Example 1 was carried out to produce a prepreg base 2 (tensile strength of carbon fibers 4,900 MPa, tensile modulus 235 GPa, unit weight of carbon fibers 150 g/m², matrix resin content 24 wt %, thickness of a prepreg base 0.14 mm).

In another kneader, an epoxy resin (35 parts by weight of "Epikote (registered trademark)" 828, 30 parts by weight of "Epikote (registered trademark)" 1001, and 35 parts by weight of "Epikote (registered trademark)" 154, manufactured by Japan Epoxy Resins Co., Ltd.), 3 parts by weight of a thermoplastic resin of polyvinyl formal (Vinylec K (registered trademark) manufactured by Chisso Corporation), 3.5 parts by weight of a dicyandiamide curing agent (DICY7 manufactured by Japan Epoxy Resins Co., Ltd.), and 3 parts by weight of a curing accelerator 3-(3,4-dichlorophenyl)-1,1-dimethyl urea (DCMU99 manufactured by Hodogaya Chemical Co., Ltd.) were heat-kneaded to prepare an epoxy resin composition 3 having a minimum viscosity of 1.5 Pa·s, which was uncured material containing polyvinyl formal dissolved uniformly.

Over both surfaces of the prepreg base 2, an additional resin layer that was in the form of resin film (unit weight 19 g/m², film thickness 0.02 mm) produced by spreading the uncured epoxy resin composition 3 having a lower viscosity than the matrix resin over a release paper with a reverse roll coater was laid to produce a preliminary prepreg base 2 (a resin content of 31 wt %, a prepreg base thickness of 0.18 mm).

Except that the preliminary prepreg base 2 was used, the same procedure as in Example 1 was carried out to produce a composite prepreg base 2, which was then used to produce a layered base 2, and a flat plate FRP was produced by molding the layered base 2. The composite prepreg base 2 of this Example carried an additional resin layer on both surfaces, and lamination operation was performed efficiently because no differences existed between the two sides.

The resulting flat plate FRP was, as the case of Example 1, free of undulations of carbon fibers and had flowed uniformly and sufficiently to the edge of the FRP. It was also free of warp, and had a highly smooth flat surface. For molding characteristics, the flowability was 1.5, and the height of the ribs formed was 15 mm, and it was confirmed that the cavity was filled with the composite prepreg base 2 up to the upper limit during the molding process. The tensile strength of the FRP was 410 MPa, which is higher than that in Example 1 because of a higher carbon fiber content, while the variation coefficient CV was 9%.

EXAMPLE 3

In a kneader, an epoxy resin (90 parts by weight of ELM 434 manufactured by Sumitomo Chemical Co., Ltd., and 10 parts by weight of Epicron 830 manufactured by Dainihon Ink Chemical Co., Ltd), 15 parts by weight of a thermoplastic polyether sulfone resin (Sumikaexcel PES5003P manufactured by Sumitomo Chemical Co., Ltd.), and 35 parts by weight of a 4,4'-diaminodiphenyl sulfone curing agent (Sumicure S manufactured by Sumitomo Chemical Co., Ltd.) were heat-kneaded to prepare an epoxy resin composition 4 (resin minimum viscosity 0.4 Pa·s), which was uncured material containing polyether sulfone dissolved uniformly.

Using this epoxy resin composition 4, the same procedure as in Example 1 was carried out to produce a prepreg base 3 (tensile strength of carbon fibers 5,400 MPa, tensile modulus 294 GPa, unit weight of carbon fibers 150 g/m², matrix resin content 25 wt %, thickness of a prepreg base 0.14 mm).

Cuts were put in this prepreg base while a resin composition produced by heat-kneading the same resin composition as the uncured epoxy resin composition 4 and spherical particles of polyamide 12 (a median diameter (D50) of 7 μm as determined by laser diffraction/scattering) to act as filler was spread over a release paper with a reverse roll coater to prepare a resin film (unit weight of resin 40 g/m², film thickness 0.04 mm, 13 g/m² of spherical particles of polyamide 12 contained in the resin film), which was then used as additional resin layer and applied to one of the surfaces of the raw prepreg base that contained cuts, providing a composite prepreg base 3 (resin content 35 wt %, thickness of a prepreg base 0.18 mm).

Using the composite prepreg base 3, the same procedure as in Example 1 except that the resin was cured under the conditions of 185° C. and 120 minutes was carried out to provide a composite prepreg base 3 and a layered base 3, followed by molding them into a flat plate FRP. A cured product (180° C., 120 min) of the epoxy resin composition 4 itself and the resin itself that constitutes the additional resin layer had a Mode I fracture toughness $G_{IC}$ of 124 J/m² and 590 J/m², respectively.

The resulting flat plate FRP was, as the case of Example 1, free of undulations of carbon fibers, and the carbon fibers had flowed uniformly and sufficiently to the edge of the FRP. It was also free of warp, and had a highly smooth flat surface. However, the FRP was slightly inferior in appearance quality than that produced in Example 1. For molding characteristics, the flowability was 1.4, and the height of the ribs formed was 15 mm, and it was confirmed that the cavity was filled with the composite prepreg base 2 up to the upper limit during the molding process. The tensile strength of the FRP was as high as 490 MPa, and the variation coefficient CV was 8%. The Mode II the fracture toughness $G_{IIC}$ of the FRP was 2.4 kJ/m².

In 10 trays produced successively by the same procedures as in Example 1, the resulting trays, all quadric portions and all gaps between the ends of adjacent discontinuous carbon fibers, even in the outermost face, were completely filled with the resin without leaving empty spaces, and the wall portions were also free of creases, indicating that the FRP products produced had high appearance quality. The fact that high quality FRP products were obtained in all the 10 molding runs proved their high quality stability.

EXAMPLE 4

Except that the unit weight of carbon fiber was 80 g/m² and the layered base had a structure of $[-45/0/+45/90]_{3S}$, the same procedure as in Example 1 was carried out to produce a flat plate FRP.

The resulting flat plate FRP was, as the case of Example 1, free of undulations of carbon fibers, and the carbon fibers had flowed uniformly and sufficiently to the edge of the FRP. It was also free of warp, and had a highly smooth flat surface. The flowability was 1.4, and the height of the ribs formed was 15 mm. The tensile strength of the FRP was 420 MPa, and the variation coefficient CV was 5%, indicating that the variation was small.

EXAMPLE 5

A prepreg base was prepared from the uncured epoxy resin composition 1, and cuts were put in the prepreg base without applying resin film to it, followed by laminating sixteen the cut-containing raw prepreg bases in a quasi-isotropic manner to produce a layered product. The layered product had a structure of $[-45/0/+45/90]_{2S}$. In producing the layered product, the same resin as the uncured epoxy resin composition 1 and spherical glass particles (acting as filler, average diameter 15 μm) subjected to epoxy silane coupling were heat-kneaded to prepare a resin composition, and it was then spread over a release paper with a reverse roll coater to provide a total of five sheets of resin film (unit weight of resin 25 g/m², film thickness 0.025 mm, containing 10 g/m² of glass spherical particles subjected to epoxy silane coupling), which were used as the outmost, fourth, eighth and twelfth layers of the resulting layered base. Except this, the same procedure as in Example 1 was carried out to produce a layered base, which was molded into a flat plate FRP.

The resulting flat plate FRP was, as the case of Example 1, free of undulations of carbon fibers, and the carbon fibers had flowed uniformly and sufficiently to the edge of the FRP. It was also free of warp, and had a highly smooth flat surface. For the molding characteristics, the flowability was 1.3, and the height of the ribs formed was 10 mm. However, the FRP was slightly poorer in appearance quality than that produced in Example 1. The tensile strength of the FRP was 400 MPa, and the variation coefficient CV was 6%, indicating that the variation was small.

EXAMPLE 6

Except that the uncured epoxy resin composition 1 together with sliver yarns (fiber length from 10 mm to 150 mm) produced by a draft zone system spinning as reinforcing fibers instead of continuous carbon fibers, that the uncured epoxy resin composition 1 was spray-coated in a particle-like state (unit weight of resin 10 g/m², film thickness 0.03 mm) to act as the additional resin layer instead of resin film, and that cuts were not put in it, the same procedure as in Example 1 was carried out to produce a composite prepreg base and a layered base, which were then molded into a flat plate FRP.

The resulting FRP was, as the case of Example 1, free of undulations of carbon fibers, and the carbon fibers had flowed uniformly and sufficiently to the edge of the FRP. It was also free of warp, and had a highly smooth flat surface. For the molding characteristics, the flowability was 1.3, and the height of the ribs formed was 6 mm. The tensile strength of the FRP was as high as 630 MPa, and the variation coefficient CV was 5%.

EXAMPLE 7

Before applying the additional resin layer to the raw prepreg base 1 produced in Example 1, the same procedure as in Example 1 was carried out to put cuts continuously using an automatic cutting machine as shown in FIG. 3 to produce a raw prepreg base 1 containing regularly-arranged cuts at equal intervals. Then, copolymerized polyamide resin ("Amilan" (registered trademark) CM4000, polyamide copolymer having a melting point of 155° C. manufactured by Toray Industries, Inc.) was meltblown into a nonwoven fabric having a weight per unit area of 20 g/m². This nonwoven fabric was applied to one surface of the cut-containing raw prepreg base 1, and they were pressed with a nip roller at room temperature to integrate them into a composite prepreg base.

The resulting composite prepreg bases were laminated to prepare a layered base as in Example 1. A surface of the prepreg base comprising the thermosetting matrix resin was adhered to that of the nonwoven fabric used as the additional resin layer to form an interface. Because the additional resin layer was the nonwoven fabric, the composite prepreg base had tackiness as a result of oozing of the matrix resin, leading to good lamination operation conditions as in Example 1. The same procedure as in Example 1 was carried out to mold an FRP product. Because the thermoplastic resin was used in the additional resin layer, the mold was cooled to about 100° C. before removing the product.

The resulting FRP was, as the case of Example 1, free of undulations of carbon fibers, and the carbon fibers had flowed uniformly and sufficiently to the edge of the FRP. It was also free of warp, and had a highly smooth flat surface. The flowability was 1.3, and the cavity for the rib was filled up to a height of 12 mm. The tensile strength of the FRP was as high as 460 MPa, and the variation coefficient CV was 5%.

EXAMPLE 8

The flat plate FRP produced in Example 7 was placed in an injection mold, and polyamide 6 pellets kneaded with carbon fibers (pellets of "Torayca" (registered trademark) manufactured by Toray Industries, Inc., carbon fiber weight content of 20 wt %, randomly dispersed discontinuous carbon fibers, fiber length of 0.2 mm), used as another FRP, were injected onto the surface of the additional resin layer adhered on the flat plate FRP to produce a complicated T-shape rib of the another FRP formed on the flat plate FRP. The polyamide 6 containing carbon fibers, i.e. the another FRP, is adhered to the additional resin layer on the flat plate FRP to form an integrated product, and the vertical adhesion strength (flatwise peel strength) between them was as high as 10 MPa or more, indicating an extremely high adhesiveness.

EXAMPLE 9

A sheet of polycarbonate ("Lexan" (registered trademark) SLX manufactured by GE Plastics Co., Ltd.), used as the another thermoplastic resin, was placed on the surface of the additional resin layer on the layered base produced in Example 7 and cured at 110° C. for 90 minutes under a pressure of 1 MPa to produce a flat plate FRP having extremely high surface quality that had a sheet adhered over its surface. During the molding of the layered base into a flat plate FRP, the additional resin layer entered into the reinforcing fibers and adhered to the polycarbonate sheet, which was a molding of the another thermoplastic resin, to form an integrated product. Their adhesion strength (shear peel strength) according to ISO4587 was as high as 5 MPa or more, indicating high adhesiveness.

COMPARATIVE EXAMPLE 1

Except that resin film was used as the additional resin layer on the preliminary prepreg base 3, the same procedure as in Example 3 was carried out to produce a flat plate FRP.

The resulting flat plate FRP was free of undulations of carbon fibers, and the carbon fibers had flowed uniformly and sufficiently to the edge of the FRP, The flowability was 1.2, and the height of the rib was 5 mm, which were inferior as compared with Examples 1 and 3. The tensile strength of the FRP was 390 MPa, and the variation coefficient CV was 6%. It had nearly the same level of mechanical characteristics as those in Example 1. The Mode II fracture toughness $G_{IIC}$ was 0.9 kJ/m$^2$.

Trays produced by the same procedure as in Example 1 were free of creases in the quadric portion next to the wall portion, but in the outermost surface, some of the gaps between the ends of adjacent bundles of discontinuous carbon fibers contained spaces free of matrix resin in all of 10 trays, resulting in slightly poorer appearance quality than in Examples 1 and 3.

COMPARATIVE EXAMPLE 2

The same epoxy resin and the same step as in Example 1 were used to produce a prepreg base 4 having a unit weight of carbon fiber of 120 g/m$^2$ and matrix resin content of 32 wt %. The matrix resin was impregnated uniformly in the reinforcing fibers, and the surface was free of localized resin portions.

Without providing the additional resin layer, the same procedures as in Example 1 was carried out to put cuts continuously in the prepreg base 4 with an automatic cutting machine as shown in FIG. 3, and thus the resulting prepreg base 4 had regularly-arranged cuts at equal intervals. Except that the additional resin layer was formed, the same procedure as in Example 1 was carried out to produce a flat plate FRP.

The resulting flat plate FRP was free of undulations of carbon fibers, and the carbon fibers had flowed uniformly and sufficiently to the edge of the FRP. The flowability was 1.2, and the height of the rib was 8 mm, which were inferior as compared with Examples 1 and 3. The tensile strength of the FRP was 370 MPa, and the variation coefficient CV was 5%. It had nearly the same or lower level of mechanical characteristics as compared with those in Example 1.

Trays produced by the same procedure as in Example 1 were free of creases in the quadric portion next to the wall portion, but in the outermost surface, some of the gaps between the ends of adjacent discontinuous carbon fibers contained spaces free of matrix resin in five of 10 trays, resulting in slightly poorer appearance quality than in Examples 1 and 3.

COMPARATIVE EXAMPLE 3

The nonwoven fabric produced from the thermoplastic resin used in Example 7 was used as a matrix resin. The same carbon fibers as in Example 1 were stretched parallel to each other in one direction to form a sheet having a unit weight of carbon fiber of 120 g/m$^2$, and two nonwoven fabric sheets of 20 g/m$^2$ were applied to each surface (totaling 4 sheets), followed by heating the matrix resin with a nip roller adjusted at 160° C. to lower the viscosity and achieve impregnation. Thus, a prepreg base 5 having a matrix resin content of 40 wt % was produced. Though the matrix resin was localized on the surface of the prepreg base 5, the thickness was not uniform and undulations of fibers were found. The prepreg base 5 was severed to observe the cross section, and it was found that some central portions in the thickness direction were left unimpregnated with the resin.

Without providing the additional resin layer, the same procedures as in Example 1 was carried out to put cuts continuously in the prepreg base 5 with an automatic cutting machine as shown in FIG. 3, and thus the resulting prepreg base 5 had regularly-arranged cuts at equal intervals. Because it was free of tackiness, its bases were simply put one on top of another to form a similar structure to that in Example 1, and preheated at 180° C. with an infrared heater (IR heater), followed by cold-pressing with a press adjusted to 70° C. to produce a flat plate FRP.

Though the resulting flat plate FRP had undulations of carbon fibers, the carbon fibers had flowed uniformly and sufficiently to the edge of the FRP. The tensile strength was 250 MPa, and the variation coefficient CV was 8%, indicating that the mechanical characteristics were very poor as compared with the FRP in Examples 1 and 3. This can be attributed to the existence of portions unimpregnated with the resin.

Trays similar to those in Example 1 were produced under the same conditions as for the flat plate FRP. They were free of creases in the quadric portion next to the wall portion, but in the outermost surface, some of the gaps between the ends of adjacent discontinuous carbon fibers contained spaces free of matrix resin in eight of 10 trays, resulting in slightly poorer appearance quality than the FRPs in Examples 1 and 3.

COMPARATIVE EXAMPLE 4

Except that the layered base produced in Comparative Example 1 was used, the same procedure as in Example 9 was carried out to provide a flat plate FRP. The resulting FRP was found integrated with the polycarbonate sheet, i.e. the another thermoplastic resin molding, but the adhesion strength (shear peel strength) was so low that they could be separated by hand, indicating poor adhesiveness.

Industrial Applicability

We provide a layered base comprising a plurality of raw prepreg bases, each comprising a fiber sheet comprising discontinuous reinforcing fibers having a fiber length of 1 to 300 mm oriented in one direction and a matrix resin impregnated in the fiber sheet, laminated with an additional resin layer provided at least on one of the outermost surfaces and at least in one of the interlayer spaces, wherein at each interface, either the two adjacent prepreg bases, or the prepreg base and the additional resin layer, are adhered at least partly to integrate the entire body, and also provides FRP moldings produced from the layered base.

We further provide a production process for a composite prepreg base comprising the raw prepreg base that constitutes the layered base and the additional resin layer formed on at least one of its surfaces.

In the layered base, the additional resin layer is provided between the raw prepreg bases and at on at least one of the surfaces of the layered base, and the raw prepreg base comprises discontinuous reinforcing fibers to allow the discontinuous fibers, the resin that constitutes the additional resin layer and the matrix resin in the raw prepreg base to flow smoothly to form the shape of the intended moldings accurately during the process for producing the FRP moldings from this a layered base. As a result, this facilitates the production of intended moldings, particularly those of a complicated shape.

The resulting moldings can be used effectively as material for structural elements that have a complicated shape containing ribs and quadric surfaces, such as those of transport equipment (automobile, aircraft, naval vessels and the like), industrial machines, precision equipment and sports equipment (bicycle, golf outfit and the like).

The invention claimed is:

1. A layered base comprising a plurality of laminated layers each of which comprises a raw prepreg base comprising a fiber sheet of discontinuous reinforcing fibers having a fiber length of 1 to 300 mm and arranged in one direction and a matrix resin impregnated into the fiber sheet, wherein an additional resin layer is provided on at least one of an outermost layer and in at least one of interlayer spaces of the laminated layers, at the interlayer spaces of the laminated layers, the raw prepreg bases and/or the raw prepreg base and the additional resin layer are adhered at least partially at an interface between them to be integrated with each other, thicknesses of at least two of the additional resin layers are different from each other, and a thickness of the additional resin layer on a surface of the layered base is larger than that of the additional resin layer inside the layered base.

2. A layered base comprising a plurality of laminated layers each of which comprises a raw prepreg base comprising a fiber sheet of discontinuous reinforcing fibers having a fiber length of 1 to 300 mm and arranged in one direction and a matrix resin impregnated into the fiber sheet, wherein an additional resin layer is provided on at least one of an outermost layer and in at least one of interlayer spaces of the laminated layers, and at the interlayer spaces of the laminated layers, the raw prepreg bases and/or the raw prepreg base and the additional resin layer are adhered at least partially at an interface between them to be integrated with each other, wherein a resin constituting the additional resin layer differs from the matrix resin constituting the raw prepreg base, and the resin constituting the additional resin layer has a minimum viscosity lower than that of the matrix resin from room temperature to a decomposition temperature, or a fracture toughness higher than that of the matrix resin.

3. A layered base comprises a plurality of laminated layers each of which is composed of a raw prepreg base comprising a fiber sheet of discontinuous reinforcing fibers having a fiber length of 1 to 300 mm with ends of at least some of the fibers substantially aligned with other ends of some others of the fibers and arranged in one direction and a matrix resin impregnated into the fiber sheet, wherein an additional resin layer is provided on at least one of the outermost layers and in at least one of interlayer spaces of the laminated layers, and at the interlayer spaces of the laminated layers, the raw prepreg bases and/or the raw prepreg base base and the additional resin layer are adhered at least partially at the interface between them to be integrated with each other, wherein the matrix resin that constitutes the raw prepreg base is a thermosetting resin, and a resin that constitutes the additional resin layer is a thermoplastic resin which is exposed on a surface of the layered base.

4. A new layered base comprising a plurality of laminated layers each of which is composed of a raw prepreg base comprising a fiber sheet of discontinuous reinforcing fibers having a fiber length of 1 to 300 mm with ends of at least some of the fibers substantially aligned with other ends of some of the fibers and arranged in one direction and a matrix resin impregnated into the fiber sheet, wherein the matrix resin is a resin composition comprising a thermosetting resin as a primary component, wherein an additional resin layer is provided on at least one of the outermost layers and in at least one of interlayer spaces of the laminated layers, and at the interlayer spaces of the laminated layers, the raw prepreg bases and/or the raw prepreg base and the additional resin layer are adhered at least partially at the interface between them to be integrated with each other.

5. The layered base according to claim 4, wherein thicknesses of at least two of the additional resin layers are different from each other.

* * * * *